(12) United States Patent
Kaneko

(10) Patent No.: US 7,197,212 B2
(45) Date of Patent: Mar. 27, 2007

(54) OPTICAL WAVEGUIDE AND METHOD OF MANUFACTURING THE SAME, CIRCUIT BOARD, OPTICAL MODULE, AND OPTICAL TRANSFER APPARATUS

(75) Inventor: Tsuyoshi Kaneko, Shinosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/670,559

(22) Filed: Sep. 26, 2003

(65) Prior Publication Data
US 2004/0106324 A1 Jun. 3, 2004

(30) Foreign Application Priority Data
Sep. 27, 2002 (JP) ............... 2002-283241

(51) Int. Cl.
*G02B 6/42* (2006.01)
*G02B 6/26* (2006.01)
(52) U.S. Cl. ...................................... 385/50
(58) Field of Classification Search ............. 385/14, 385/88–89, 49–50, 129–132
See application file for complete search history.

(56) References Cited

U.S. PATENT DOCUMENTS

| 5,163,118 A | * | 11/1992 | Lorenzo et al. ............. 385/132 |
| 5,402,511 A | * | 3/1995 | Malone et al. ................ 385/43 |
| 5,534,101 A | | 7/1996 | Keyworth et al. ..... 156/244.12 |
| 6,065,881 A | * | 5/2000 | Okada et al. ................. 385/88 |

FOREIGN PATENT DOCUMENTS

| JP | A 62-83337 | 4/1987 |
| JP | A-63-128304 | 5/1988 |
| JP | A 9-243858 | 9/1997 |
| JP | 2002-14250 | 1/2002 |
| JP | A 2002-202426 | 7/2002 |
| JP | 2002-258089 | 9/2002 |
| JP | A 2002-331532 | 11/2002 |
| JP | A 2003-21740 | 1/2003 |

* cited by examiner

*Primary Examiner*—Javaid H. Nasri
(74) *Attorney, Agent, or Firm*—Oliff & Berridge, PLC

(57) ABSTRACT

To provide an optical waveguide in which the mounting position, form, and size are favorably controlled, and a method of manufacturing the same an optical waveguide includes discharging a liquid material onto a substrate to form an optical waveguide precursor and hardening the optical waveguide precursor to form an optical waveguide.

14 Claims, 17 Drawing Sheets

OPTICAL WAVEGUIDE AND METHOD OF MANUFACTURING THE SAME, CIRCUIT BOARD, OPTICAL MODULE, AND OPTICAL TRANSFER APPARATUS

BACKGROUND OF THE INVENTION

1. Field of Invention

The present invention relates to an optical waveguide whose setting position, form, and size have been favorably controlled and to a method of manufacturing the same.

The present invention also relates to a circuit board, an optical module, and an optical transfer apparatus that include such an optical waveguide.

2. Description of Related Art

Optical waveguides are used to transfer near infrared light and visible light. Such optical waveguides have a variety of uses, such as the transfer of optical signals, the transfer of energy, optical sensors, optical fiber scopes, and the like.

One related art example of a method of manufacturing an optical waveguide is disclosed in Japanese Laid-Open Patent Publication No. H09-243858.

SUMMARY OF THE INVENTION

The present invention is intended to provide an optical waveguide whose setting position, form, and size have been favorably controlled and to a method of manufacturing the same.

The present invention is further intended to provide a circuit board, an optical module, and an optical transfer apparatus that include such an optical waveguide.

1. First Exemplary Method of Manufacturing an Optical Waveguide

A first exemplary method of manufacturing an optical waveguide of the present invention includes:
  (a) discharging droplets onto a surface of a substrate to form an optical waveguide precursor; and
  (b) hardening the optical waveguide precursor to form an optical waveguide.

According to the first exemplary method of manufacturing an optical waveguide of the present invention, the droplets are discharged onto the surface of the substrate to form the precursor and then the optical waveguide is formed by hardening the precursor. Here, by adjusting the discharged amount of the droplets, it is possible to form an optical waveguide that has a predetermined form and size. Also, by discharging the droplets at a desired position, it is possible to form the optical waveguide at a predetermined position.

In this case, it is possible to also include a step (c) of forming a film pattern that has different wettability to the substrate, on the substrate, before the droplets are discharged. In this way, by controlling the wettability of the substrate surface for the droplets, it is possible to control the setting position of the optical waveguide.

Also, in this case, the film pattern can be more wettable than the substrate for the droplets, and in step (a) the droplets can be discharged onto the film pattern to form the optical waveguide precursor.

Alternatively, in this case, the film pattern can be less wettable than the substrate for the droplets, and in step (a) the droplets can be discharged onto a region of the substrate aside from the film pattern, to form the optical waveguide precursor.

2. Second Exemplary Method of Manufacturing an Optical Waveguide

A second exemplary method of manufacturing an optical waveguide of the present invention includes:
  (a) forming a convex part on a substrate;
  (b) discharging droplets onto an upper surface of the convex part to form a precursor of an optical waveguide part; and
  (c) hardening the precursor to form an optical waveguide part.

Here, the "substrate" is a body with a surface on which the convex part can be set. The surface may be a flat surface or a curved surface so long as the convex part can be set. If such a surface is present, there are no particular limitations on the form of the substrate itself. Also, the convex part may be integrally provided on the substrate.

Also, the "convex part" refers to a member that has an upper surface on which the optical waveguide part can be set and the "upper surface of the convex part" refers to a surface on which the optical waveguide part is set. There are no particular limitations on the form of the upper surface of the convex part, and so long as the optical waveguide part can be set, the upper surface may be a flat surface or a curved surface.

According to the second exemplary method of manufacturing an optical waveguide of the present invention, by adjusting the form, size and setting position of the upper surface of the convex part in step (a) and adjusting the discharged amount of the droplets in step (b), it is possible to form an optical waveguide part whose form, size and setting position have been favorably controlled. This is described in more detail below.

In this case, by providing a base member on the substrate in step (a), it is possible to form a convex part on the substrate.

Alternatively, by forming a groove in the substrate in step (a), it is possible to form a convex part on the substrate.

Also, in this case, it is possible to include a step (f) of adjusting the wettability for the droplets of an upper surface of the convex part before the droplets are discharged. By doing so, an optical waveguide part of the desired form and size can be formed. Here, by forming a film with a lyophilic or a lyophobic property for the droplets on the upper surface of the convex part, it is possible to control the wettability of the upper surface of the convex part for the droplets.

The first and second exemplary methods of manufacturing an optical waveguide of the present invention can have the following aspects (1) to (6).
  (1) The hardening of the precursor can be performed by adding energy.
  (2) The droplets can have a property whereby the droplets can be hardened by applying energy.
  (3) The discharging of the droplets can be performed according to an ink jet method. By using such a method, it is possible to minutely adjust the discharged amount of the droplets, so that a minute optical waveguide part (or optical waveguide) can be easily set on the upper surface of the convex part (or on the substrate).
  (4) In addition, it is possible to include a step (d) of covering the optical waveguide part with a layer that has a lower refractive index than the optical waveguide part. By performing this process, it is possible to reduce the leakage of light from the optical waveguide part. This makes it possible to increase the propagation efficiency for the light propagated inside the optical waveguide part.

(5) It is possible to form a covering layer around the optical waveguide part and to set the refractive index of the convex part and the refractive index of the covering layer approximately equal. By doing so, in the same way as in the construction of an optical fiber, the entire circumference of the optical waveguide part can be covered with materials with approximately the same refractive index.

(6) It is possible to include a step (e) of detaching the optical waveguide part from the substrate. By performing this process, it is possible to use the optical waveguide part as a separate optical waveguide.

3. Third Exemplary Method of Manufacturing an Optical Waveguide

A third exemplary method of manufacturing an optical waveguide of the present invention includes:

(a) forming a first convex part on a substrate;
(b) forming a second convex part on the substrate in parallel with the first convex part;
(c) discharging first droplets onto an upper surface of the first convex part to form a precursor of an optical waveguide part;
(d) hardening the precursor of the optical waveguide part to form the optical waveguide part;
(e) forming a precursor for a covering layer that is formed on an upper surface of the second convex part and covers the optical waveguide part; and
(f) hardening the precursor for a covering layer to form a covering layer with a lower refractive index than the optical waveguide part.

Here, the meanings of "substrate", "convex part", and "upper surface of the convex part" are the same as in the "Method of Manufacturing the Second Optical Waveguide" section. The meanings of "convex part" and "upper surface of the convex part" are the same for the first convex part and the second convex part.

The third exemplary method of manufacturing an optical waveguide of the present invention has the same work and effects as the first and second exemplary methods of manufacturing an optical waveguide. In addition, by forming a precursor for a covering layer that covers the optical waveguide part on the upper surface of the second convex part and hardening the precursor for a covering layer to form a covering layer with a lower refractive index than the optical waveguide part, it is possible to reduce the leakage of light from the optical waveguide part. By doing so, an optical waveguide with even more superior propagation efficiency for light can be obtained. It is also possible to obtain an optical waveguide that is more circular in cross-section.

The third exemplary method of manufacturing an optical waveguide of the present invention can have the following aspects (1) to (6).

(1) In step (e), the precursor for a covering layer can be formed by discharging second droplets onto the optical waveguide part and the upper surface of the second convex part.

(2) In step (b), two second convex parts can be formed and the first convex part can be disposed between the two second convex parts. By setting the two convex parts so that the first convex part is sandwiched between them, in the process where the droplets are discharged in order to form the precursor for a covering layer, it is possible to form the covering layer on the upper surfaces of the second convex parts and on the inside of the second convex parts. That is, by setting the second convex parts at predetermined positions, it is possible to control the setting position, form, and size of the covering layer.

(3) The first and second droplets can have a property whereby the droplets can be hardened by applying energy.

(4) The hardening of the covering layer can be performed by adding energy.

(5) The first and second droplets can have a property whereby the droplets can be hardened by applying energy.

(6) The discharging of the first and second droplets can be performed according to an ink jet method.

4. First Exemplary Optical Waveguide

A first exemplary optical waveguide of the present invention includes:

a convex part provided on a substrate; and
an optical waveguide part provided on the convex part.

Here, the meanings of "substrate", "convex part", and "upper surface of the convex part" are the same as in the "Method of Manufacturing the Second Optical Waveguide" section.

With the first exemplary optical waveguide of the present invention that has the construction described above, by controlling the form and height, etc., of the upper surface of the convex part, it is possible to obtain an optical waveguide that includes an optical waveguide part whose setting position, form, and size have been favorably controlled. This is described in more detail below.

The first exemplary optical waveguide of the present invention can have the following aspects (1) to (14).

(1) The optical waveguide part can be formed by hardening a material that can be hardened by applying energy.

(2) The optical waveguide part can be made of ultraviolet curing resin or thermosetting resin.

(3) An end surface of the optical waveguide part can be a curved surface.

(4) The optical waveguide part can be covered by a layer with a lower refractive index than the optical waveguide part. In this case, the optical waveguide part can be buried under the layer.

(5) The convex part can have a lower refractive index than the optical waveguide part.

(6) The convex part can be a base member formed on the substrate.

(7) The convex part can be integrally formed with the substrate.

(8) A cross-section of the optical waveguide part can be in the shape of a truncated circle or a truncated oval. Here, a "truncated circle" refers to the shape obtained when a circle is cut using a straight line and includes a form that is not only perfectly circular, but which resembles a circle. Also, a "truncated oval" refers to the shape obtained when an oval is cut using a straight line and includes a form that is not only perfectly oval, but which resembles an oval.

(9) The cross-section of the optical waveguide part can be in the shape of a circle or an oval.

(10) The optical waveguide part can have at least one curved part.

(11) The optical waveguide part can have at least one branch.

(12) An upper surface of the convex part can be a curved surface.

(13) An angle made between an upper surface of the convex part and a surface that contacts the upper surface on a side part of the convex part is acute. With this construction, when the optical waveguide part is formed by discharging droplets to form a precursor of an optical waveguide part and then hardening the precursor, the side surface(s) of the convex part can be prevented from becoming wet due to the droplets. As a result, it is possible to reliably form an optical waveguide part of the desired form and size.

(14) The upper part of the convex part can be formed in an inversely tapered shape. Here, the "upper part of the convex part" refers to a region of the convex part that is close to the upper surface. With this construction, when an optical waveguide part is formed by discharging the droplets to form the precursor of the optical waveguide part and then hardening the precursor, the stability of the convex part can be maintained and the angle made between the upper surface and the side surface of the convex part can be further reduced. By doing so, the side surface(s) of the convex part can be reliably prevented from being becoming wet due to the droplets. As a result, it is possible to form an optical waveguide part of the desired form and size more reliably.

(15) The optical waveguide can be buried under a layer with a lower refractive index than the optical waveguide part. By doing so, it is possible to reliably fix the optical waveguide part onto the upper surface of the convex part.

5. Second Exemplary Optical Waveguide

A second exemplary optical waveguide of the present invention includes:

a first convex part provided on a substrate;

an optical waveguide part provided on an upper surface of the first convex part;

a second convex part disposed in parallel with the first convex part; and a covering layer that covers an optical waveguide part and is provided in part on an upper surface of the second convex part.

Here, the meanings of "substrate", "convex part", and "upper surface of the convex part" are the same as in the "Method of Manufacturing the Second Optical Waveguide" section. The meanings of "convex part" and "upper surface of the convex part" are the same for the first convex part and the second convex part.

The second exemplary optical waveguide of the present invention has the same work and effects as the first exemplary optical waveguide. In addition, it is possible to form an optical waveguide that is more circular in cross-section. By doing so, it is possible to obtain an optical waveguide that has even more superior propagation efficiency for light.

In this case, it is possible to include two second convex parts and to dispose and the first convex part between the two second convex parts. With this construction, by setting the second convex parts at predetermined positions, it is possible to obtain an optical waveguide with a covering layer whose setting position, form, and size have been controlled.

6. Circuit Board, Optical Module, and Optical Transfer Apparatus

The circuit board of the present invention includes the above optical waveguide, an IC, and an optical element.

The optical module of the present invention includes the above optical waveguide and an optical element. In addition, the optical transfer apparatus of the present invention includes the above optical module of the present invention.

DETAILED DESCRIPTION OF PREFERRED EMBODIMENTS

First Exemplary Embodiment

1. Method of Manufacturing an Optical Waveguide

Figure 1:
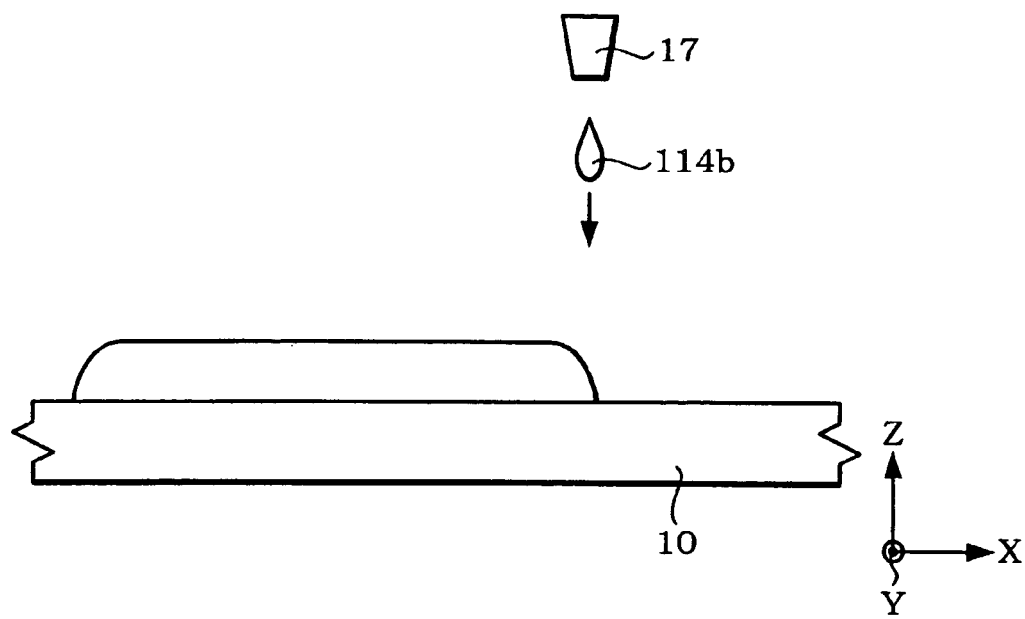
FIG. 1 is a cross-sectional view showing a schematic for one process in a method of manufacturing an optical waveguide according to a first exemplary embodiment.
Figure 2:
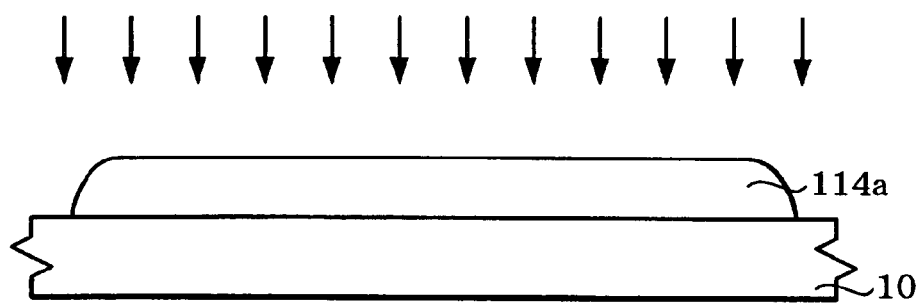
FIG. 2 is a cross-sectional view showing a schematic for one process in the method of manufacturing an optical waveguide according to the first exemplary embodiment.
Figure 3:
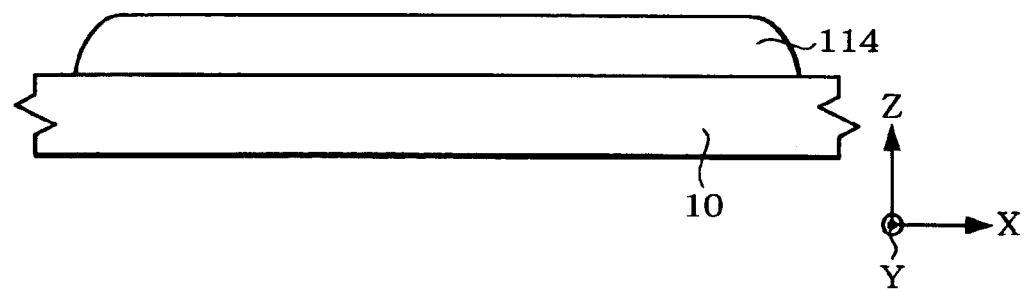
FIG. 3 is a cross-sectional view showing a schematic for one process in the method of manufacturing an optical waveguide according to the first exemplary embodiment.
Figure 4:
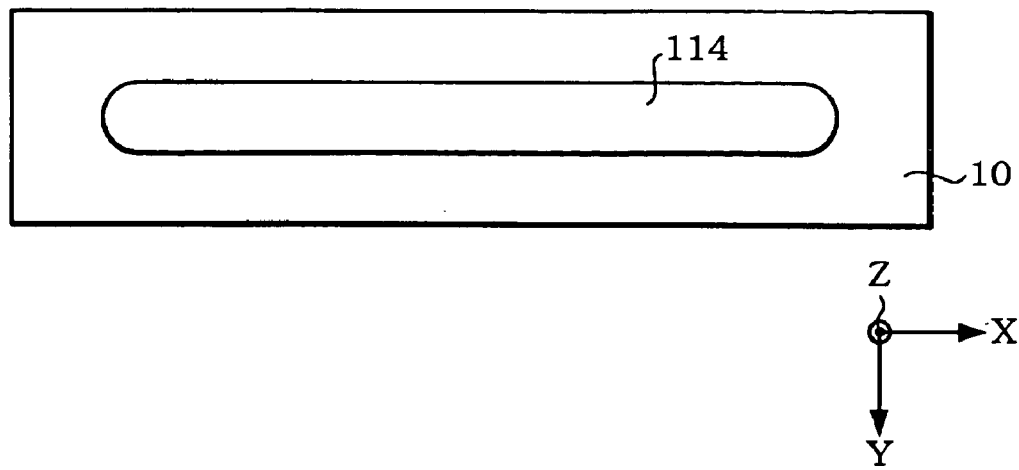
FIG. 4 is a plan view showing a schematic of the optical waveguide shown in FIG. 3.
Figure 5:
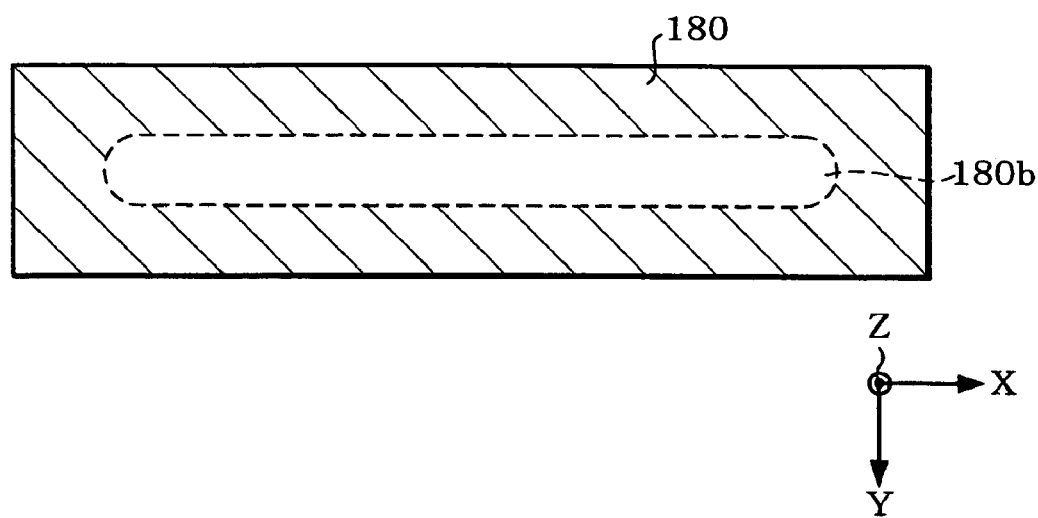
FIG. 5 is a cross-sectional view showing a schematic for one process in the method of manufacturing an optical waveguide according to the first exemplary embodiment.

FIGS. 1 to 3 are cross-sectional views that respectively show schematics of the processes in the method of manufacturing an optical waveguide 114 (see FIG. 3), according to a first exemplary embodiment of the present invention. FIG. 4 is a plan view showing a schematic of the optical waveguide 114 shown in FIG. 3. FIG. 5 shows an additional process for the method of manufacturing the optical waveguide 114 shown in FIG. 3.

(1) First, droplet 114b are discharged onto a substrate 10 to form a precursor 114a for the optical waveguide (see FIGS. 1 and 2). More specifically, the droplet 114b are discharged from a droplet discharge opening 17 onto a predetermined region of the substrate 10. By performing this process, a precursor 114a of an optical waveguide of the desired form and size can be formed. A semiconductor substrate, such as a silicon substrate or a GaAs substrate, or a glass substrate or the like can be given as examples for the substrate 10, though provided that there is a surface upon which the droplet 114b can impact, there are no particular limitations on the substrate.

The droplet 114b is made of a liquid material that is capable of being hardened by adding energy, such as heat or light. A precursor of an ultra violet curing resin or a thermosetting resin can be given as an example of such a liquid material. Ultraviolet-curing acrylic resin and epoxy resin can be given as examples of a ultraviolet curing resin. In the same way, thermosetting polyimide resin can be given as an example of a thermosetting resin.

A dispenser method or an ink jet method can be given as an example of the droplet ejecting method. The dispenser method is a standard method for discharging droplets, and is effective in cases where the liquid material is discharged onto a comparatively wide region. The ink jet method is a method where droplets are discharged using an ink jet head, with it being possible to control the discharge position of the droplets in units to the order of μm. Also, the amount of discharged droplets can be controlled in units in the order of picoliters, so that it is possible to manufacture an optical waveguide 114 (see FIG. 3) with a minute construction.

(2) Next, the precursor 114a of the optical waveguide is hardened to form the optical waveguide 114 (see FIG. 2). More specifically, energy such as heat or light is applied to the precursor 114a of the optical waveguide. When the precursor 114a of the optical waveguide is hardened, an appropriate method is used for the type of droplet 114b. More specifically, the addition of energy, or irradiation with ultraviolet light or laser light, etc., can be given as examples of such methods. By performing the above processes, the optical waveguide 114 shown in FIGS. 3 and 4 is obtained. This optical waveguide 114 is formed from a material that can transmit light of a predetermined wavelength.

In this process, the droplet 114b can be successively hardened after impacting on the substrate 10. That is, the precursor 114a of the optical waveguide can be formed in its entirety and then hardened in a single operation, or hardening can be performed successively for parts where the droplets have impacted on the substrate 10.

Also, in process (1) described above, before the droplet 114b are discharged, it is possible to form a film pattern with different wettability to the substrate 10 in a predetermined region of the substrate 10 as necessary. That is, it is possible to perform a lyophilic process or lyophobic process on a predetermined region of the substrate 10. In this way, controlling the wettability of the surface of the substrate 10 with respect to the droplet 114b, can also control the setting position of the optical waveguide 114.

As one example, as shown in FIG. 5, a film pattern 180, that has a lyophobic quality for the droplet 114b, is formed in a region aside from a region of the optical waveguide 114 to be formed. After this, as shown in FIG. 1, when the droplet 114b is discharged onto the film pattern 180, the droplet 114b is lyophobic against the film pattern 180, so that the droplet 114b is positioned on a region 180b that is more lyophilic for the droplet 114b than the film pattern 180. That is, since the film pattern 180 is less wettable than the substrate 10 for the droplet 114b, the droplet 114b is positioned in the region 180b that is more wettable. After this, by performing the aforementioned hardening process, it is possible to obtain an optical waveguide 114 that has been formed at the desired position. As shown above, by forming the film pattern 180 on the substrate 10, it is possible to control the position for forming the optical waveguide 114.

Alternatively, although not illustrated, when the surface of the substrate 10 has low wettability for the droplet 114b, a film pattern that is lyophilic for the droplet 114b is formed in the region of the optical waveguide 114 to be formed. After this, as shown in FIG. 1, when the droplet 114b is discharged onto the substrate 10, the film pattern is more wettable for the droplet 114b, so that the droplet 114b is positioned on the region in which the film pattern is formed. After this, by performing the aforementioned hardening process, it is possible to obtain an optical waveguide 114 that has been formed at the desired position. In this case also, by forming the film pattern on the substrate 10, it is possible to control the position for forming the optical waveguide 114.

The optical waveguide 114 that is obtained by the method of manufacturing described above is provided on the substrate 10 as shown in FIGS. 3 and 4.

According to the method of manufacturing an optical waveguide according to the present exemplary embodiment, the droplet 114b is discharged onto the substrate 10 to form a precursor 114a of the optical waveguide and then this precursor 114a is hardened to form the optical waveguide 114. Here, by adjusting the discharged amount of the droplet 114b, it is possible to form the optical waveguide 114 of a predetermined form and size. Also, by discharging the droplet 114b at a desired position, it is possible to form the optical waveguide 114 at a predetermined position.

Second Exemplary Embodiment

1. Construction of the Optical Waveguide

Figure 6:
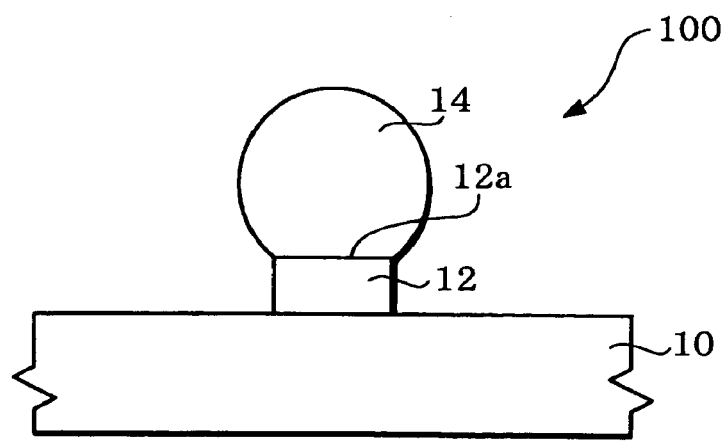
FIG. 6 is a cross-sectional view showing a schematic of an optical waveguide according to a second exemplary embodiment.
Figure 7:
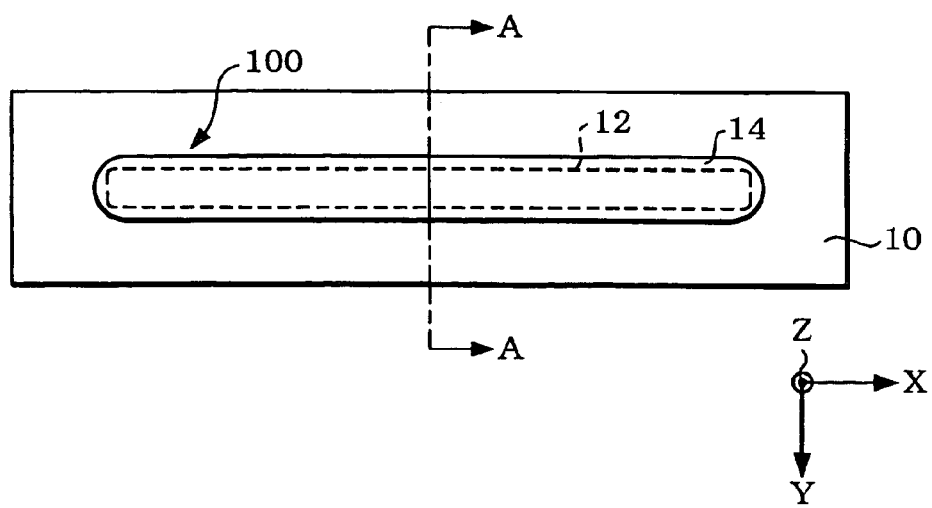
FIG. 7 is a plan view showing a schematic of an optical waveguide according to the second exemplary embodiment.
Figure 8:
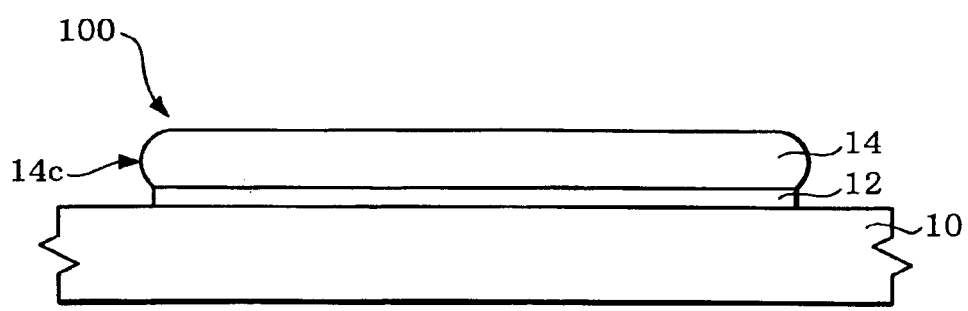
FIG. 8 is a side view showing a schematic of an optical waveguide according to the second exemplary embodiment.

FIG. 6 is a cross-sectional view that shows a schematic of an optical waveguide 100 according to a second exemplary embodiment of the present invention. FIG. 7 is a plan view showing a schematic of the optical waveguide 100 according to the second exemplary embodiment of the present invention. FIG. 8 is a side view showing a schematic of the optical waveguide 100 according to the second exemplary embodiment of the present invention. FIG. 6 shows a cross section taken along the plane A—A in FIG. 7.

Figure 9:
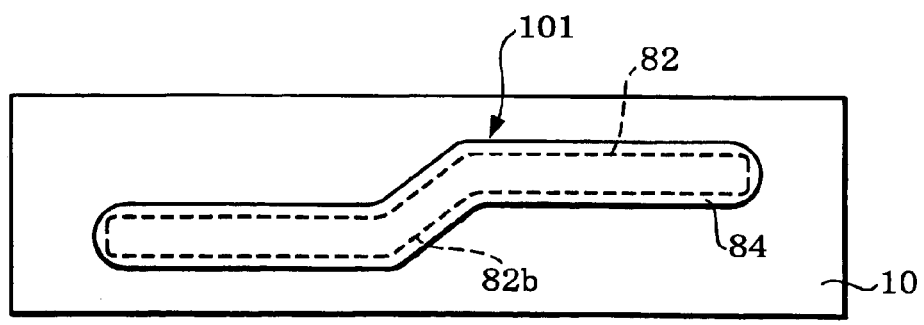
FIG. 9 is a plan view showing a schematic of a modification of the optical waveguide according to the second exemplary embodiment.
Figure 10:
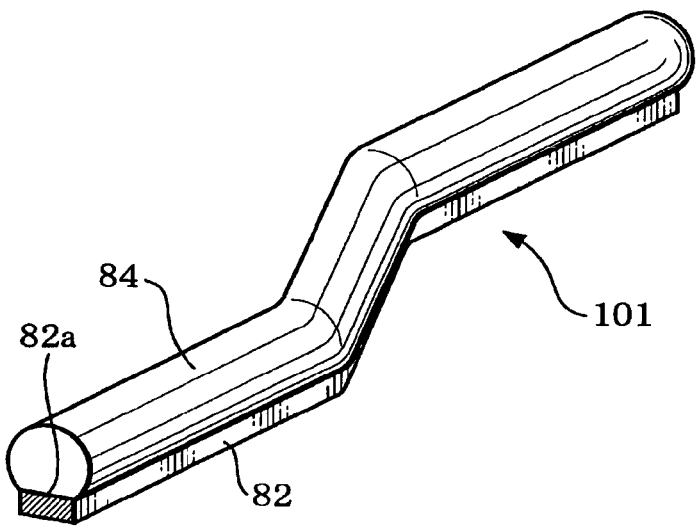
FIG. 10 is a perspective view showing a schematic of the optical waveguide shown in FIG. 9.
Figure 11:
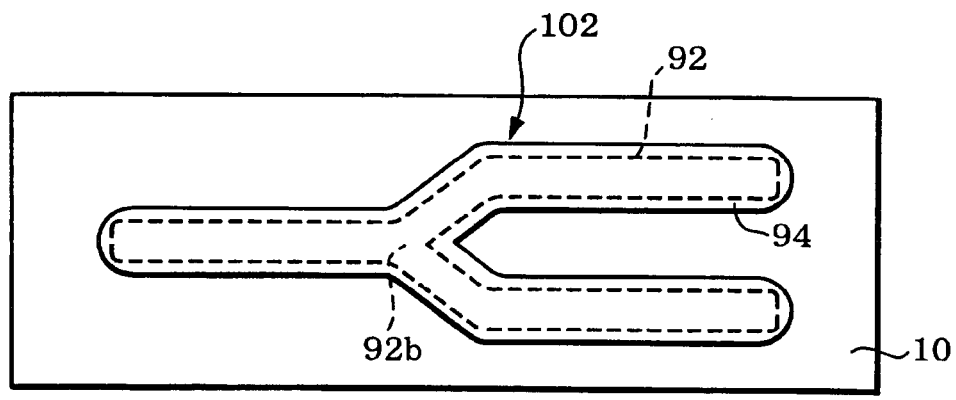
FIG. 11 is a plan view showing a schematic of another modification of the optical waveguide according to the second exemplary embodiment.
Figure 12:
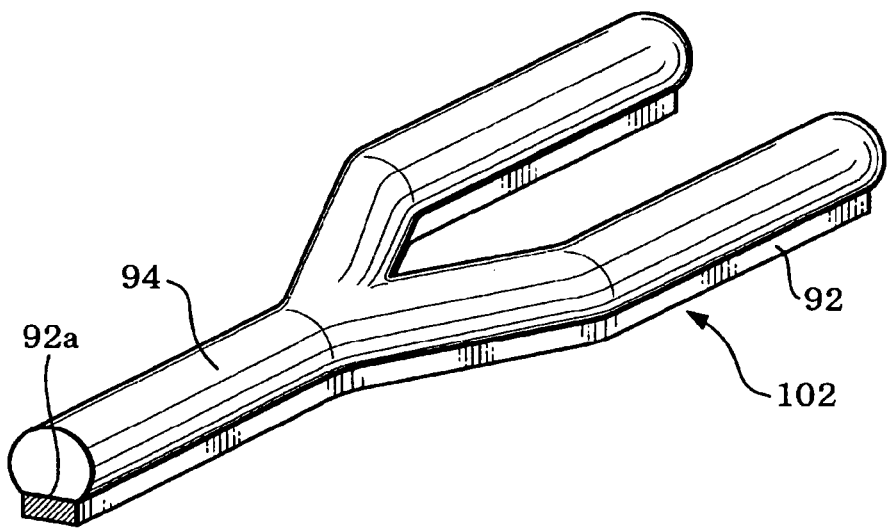
FIG. 12 is a perspective view showing a schematic of the optical waveguide shown in FIG. 11.
Figure 13:
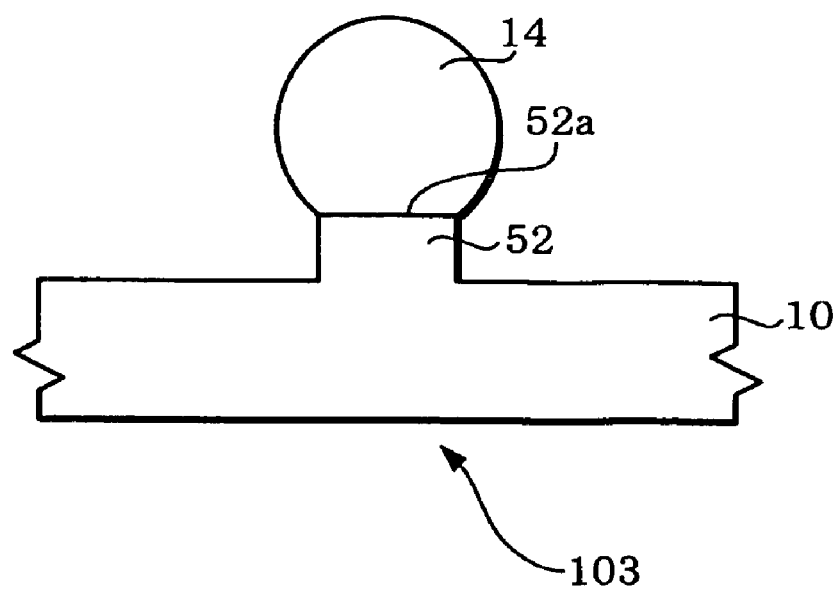
FIG. 13 is a cross-sectional view showing a schematic of another modification of the optical waveguide according to the second exemplary embodiment.

Also, FIGS. 9 to 13 show modifications of an optical waveguide according to the present exemplary embodiment. More specifically, FIG. 9 is a plan view showing a schematic of a modification of the optical waveguide of the present exemplary embodiment. FIG. 10 is a perspective view showing a schematic of the optical waveguide 101 shown in FIG. 9. FIG. 11 is a plan view showing a schematic of another modification of the optical waveguide of the present exemplary embodiment. FIG. 12 is a perspective view showing a schematic of the optical waveguide 102 shown in FIG. 11. FIG. 13 is a cross-sectional view showing a schematic of another modification of an optical waveguide according to the present exemplary embodiment. In each of these modifications, parts that have the same construction as in the optical waveguide 100 of the present exemplary embodiment are given the same reference numerals and detailed description of such is omitted.

The optical waveguide 100 of the present exemplary embodiment includes a convex part (base member) 12 that is provided on the substrate 10 and an optical waveguide part 14 that is provided on an upper surface 12a of the convex part 12. In the present exemplary embodiment, a case where the optical waveguide part 14 is made of the same material as the optical waveguide 114 of the first exemplary embodiment is described. For this reason, description of the material of the optical waveguide part 14 is omitted. The following mainly describes the various construction elements of the optical waveguide 100 of the present exemplary embodiment with reference to FIGS. 6 to 8.

Convex Part (A) Material

There are no particular limitations on the material of the convex part 12, but the convex part 12 preferably has a lower refractive index than the optical waveguide part 14. With such a construction, light can be efficiently propagated inside the optical waveguide part 14.

The convex part 12 is made of resin. In this case, the convex part 12 is made of polyimide resin, acrylic resin, epoxy resin, or fluororesin, for example. In the optical waveguide 100 of the present exemplary embodiment, the case where the convex part 12 is made of polyimide resin is described.

The convex part may be a base member that is provided on the substrate 10, or may be a convex part formed by forming a groove in the substrate 10. The optical waveguide 100 of the present exemplary embodiment shows the case where the convex part 12 is made of a base member provided on the substrate 10.

Alternatively, as in the modification (the optical waveguide 103) shown in FIG. 13, a convex part 52 may be integrally formed with the substrate 10. That is, in this case, the convex part 52 is formed of the same material as the substrate 10. As one example, this kind of convex part 52 is formed by patterning the substrate 10 and forming a groove. The convex parts that compose the optical waveguides of the exemplary embodiments described later may also be integrated with the substrate 10.

(B) Three-Dimensional Form

Although there are no particular limitations on the three-dimensional form of the convex part, the convex part needs to be constructed so that an optical waveguide can be set on the upper surface of the convex part. For example, as shown in FIG. 1, the optical waveguide part 14 can be set on the upper surface 12a of the convex part 12 of the optical waveguide 100. The three-dimensional form of the convex part is described in detail later in the second exemplary embodiment.

(C) Form of the Upper Surface

The form of the upper surface of the convex part is determined according to the function and use of the optical waveguide formed on the upper surface of the convex part. That is, the optical waveguide of the present exemplary embodiment is formed by discharging droplets onto the upper surface of the convex part to form an optical waveguide part precursor and then hardening this precursor to form the optical waveguide part, so that by controlling the form of the upper surface of the convex part, it is possible to control the form of the optical waveguide.

As one example, in the optical waveguide 100 (see FIGS. 6 to 8), the upper surface 12a of the convex part 12 is in the form of a rectangle. As a result, the optical waveguide part 14 is formed in a straight line. Also, in the optical waveguide 101 shown in FIGS. 9 and 10, an upper surface 82a (see FIG. 10) of a convex part 82 has a curved part 82b. As a result, an optical waveguide part 82 has a curved part. Alternatively, in the optical waveguide 102 shown in FIGS. 11 and 12, an upper surface 92a of a convex part 92 (see FIG. 12) has a branch 92b. As a result, the optical waveguide part 94b has a branch. As shown in FIGS. 10 and 11, according to the optical waveguide of the present exemplary embodiment, even when the optical waveguide has a curved part or a branch, the cross-section of the optical waveguide part can be formed in an approximately circular shape. By doing so, the propagation efficiency for light can be increased even in optical waveguides that have curved parts and/or branches. There are no particular limitations on the number and form of the curved parts and branches, and the number and form of the curved parts and branches can be appropriately set by appropriately setting the form of the upper surface of the convex part.

Also, with the optical waveguides in the exemplary embodiments described later, by forming curved parts and/or branches in the upper surface of the convex part in the same way as in the modification described above, it is possible to form optical waveguide parts with curved parts and/or branches.

Optical Waveguide Part (A) Three-Dimensional Form

The optical waveguide part has a three-dimensional form in keeping with the use and function of the optical waveguide part. As shown in FIG. 6, the optical waveguide part 14 of the present exemplary embodiment has a cross-sectional form in the shape of a truncated circle. In this case, by adjusting the amount of droplets used to form the optical waveguide part 14, it is possible to set the cross-sectional form of the optical waveguide part 14 in the shape of a truncated oval. The three-dimensional form of the optical waveguide part is described in the "Convex Part" section, so detailed description of it is omitted.

(B) Material

The optical waveguide part 14 is made of a material that propagates light of a predetermined wavelength. The optical waveguide part 14, like the optical waveguide 114 of the first exemplary embodiment, is formed by hardening a liquid material that is capable of being hardened by adding energy, such as heat or light. More specifically, the optical waveguide part 14 of the present exemplary embodiment is formed by discharging droplet 14b, made of the aforementioned liquid material, onto the upper surface 12a of the convex part 12 to form a precursor 14a of the optical waveguide part and then hardening this precursor 14a. This is described in detail later in this specification.

2. Method of Manufacturing the Optical Waveguide

Next, the method of manufacturing the optical waveguide 100 shown in FIGS. 6 to 8 is described with reference to FIGS. 14(A) to 14(E) and FIGS. 15(A) and 15(B). FIGS. 14(A) to 14(E) and FIGS. 15(A) and 15(B) are cross-sectional drawings that respectively show schematics of the manufacturing processes of the optical waveguide 100 shown in FIGS. 6 to 8.

(1) Forming the Convex Part 12

First the convex part 12 is formed on the substrate 10 (see FIGS. 14(A) to 14(E)). The form of the optical waveguide part 14 that is formed by a later process is determined by determining the form of the convex part 12. That is, the form of the convex part 12 is determined by the desired form of the optical waveguide part 14. When forming the convex part 12, a method (such as a selective growth method, a dry etching method, a wet etching method, a lift-off method, and a transfer method) is selected in accordance with the material, form, and size of the convex part 12. Also, as mentioned earlier, the present exemplary embodiment describes the case when the convex part 12 is made of polyimide resin.

First, after applying a polyimide precursor onto the substrate 10, which is made of a glass substrate, a heat treatment is performed at around 150° C. (see FIG. 14(A)). By doing so, a resin layer 12x is formed. Here, the resin layer 12x is in a state where it can hold its shape, but it is not completely hardened.

Figure 14A:
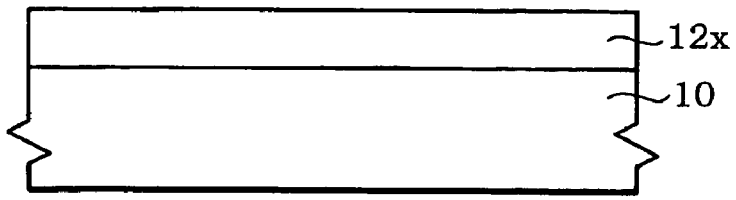
FIGS. 14(A) to 14(E) are cross-sectional views respectively showing schematics of processes in the method of manufacturing the optical waveguide shown in FIGS. 6 to 8.
Figure 14B:
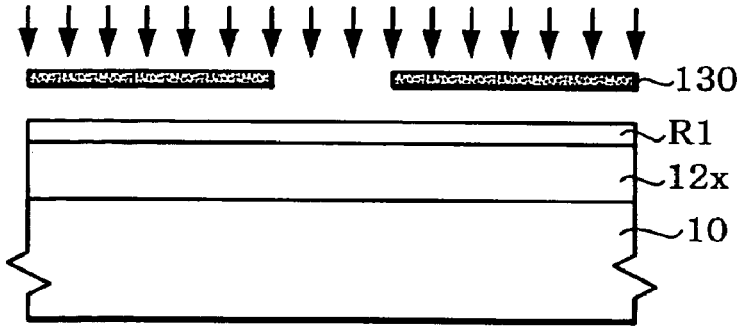
Figure 14C:
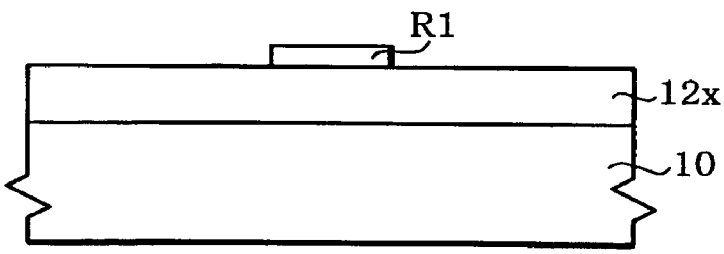
Figure 14D:
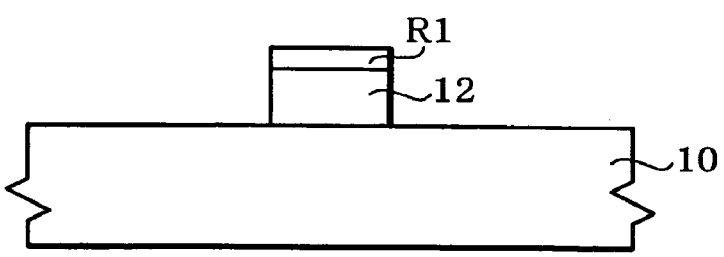
Figure 14E:
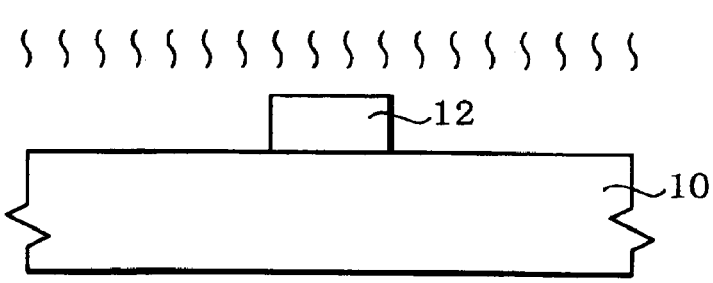

Next, after forming a resist layer R1 on the resin layer 12x, a photolithography process is performed (see FIG. 14(B)) using a mask 130 with a predetermined pattern. By doing so, a resist layer R1 with a predetermined pattern is formed (see FIG. 14(C)).

Next, the resin layer 12x is patterned through wet etching with an alkaline solution, for example, using the resist layer R1 as a mask. By doing so, the convex part (base member) 12 is formed (see FIG. 14(D)). Subsequently, the resist layer R1 is removed, then a heat treatment is performed at around 350° C., thereby completely hardening the convex part 12 (see FIG. 14(E)).

(2) Forming the Optical Waveguide Part 14

Figure 15A:
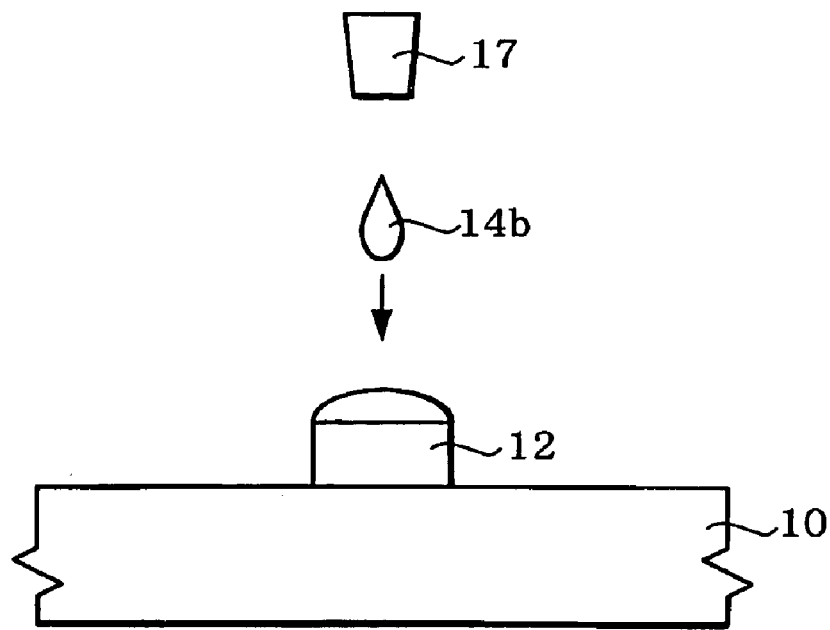
FIGS. 15(A) and 15(B) are cross-sectional views showing schematics of processes in the method of manufacturing the optical waveguide shown in FIGS. 6 to 8.
Figure 15B:
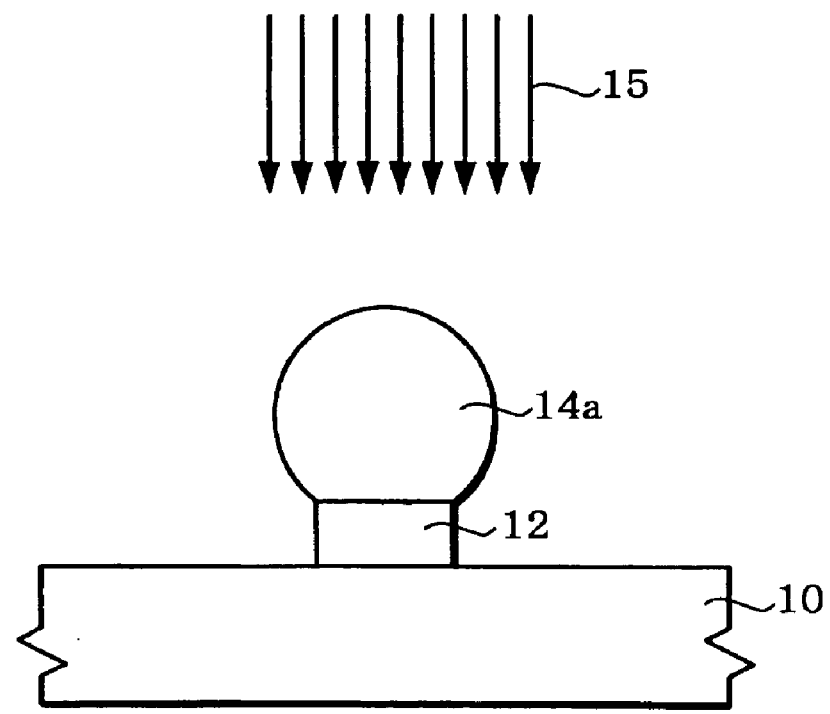

Next, the optical waveguide part 14 is formed (see FIGS. 15(A) and 15(B)). First, as shown in FIG. 15(A), the droplet 14b for forming the optical waveguide part 14 is discharged onto the upper surface 12a of the convex part 12 to form the precursor 14a of the optical waveguide part. As mentioned above, the liquid material that composes the droplet 14b has a property whereby the material can be hardened by adding energy.

A method similar to that used when discharging the droplet 114b in the first exemplary embodiment described above can be used to discharge the droplet 14b. Before the droplet 14b are discharged, it is possible to control the wettability of the upper surface 12a for the droplet 14b by performing a lyophilic process or lyophobic process on the upper surface 12a of the convex part 12 as necessary. By doing so, an optical waveguide part 14 with a predetermined form and size can be formed.

Next, as shown in FIG. 15(A), the precursor 14a of the optical waveguide part is hardened, thereby forming the optical waveguide part 14. More specifically, energy 15, such as heat or light is applied to the precursor 14a of the optical waveguide part. When the precursor 14a of the optical waveguide part is hardened, a method that is suitable for the type of the aforementioned liquid material is used. More specifically, as examples, the energy 15 can be applied by adding heat energy, or irradiating with light, such as ultraviolet light or laser light. Here, the amount of energy 15 is adjusted as appropriate for the form, size, and material of the precursor 14a of the optical waveguide part. By performing the above processes, the optical waveguide 100 including the optical waveguide part 14 is obtained (see FIGS. 6 to 8).

Figure 16:
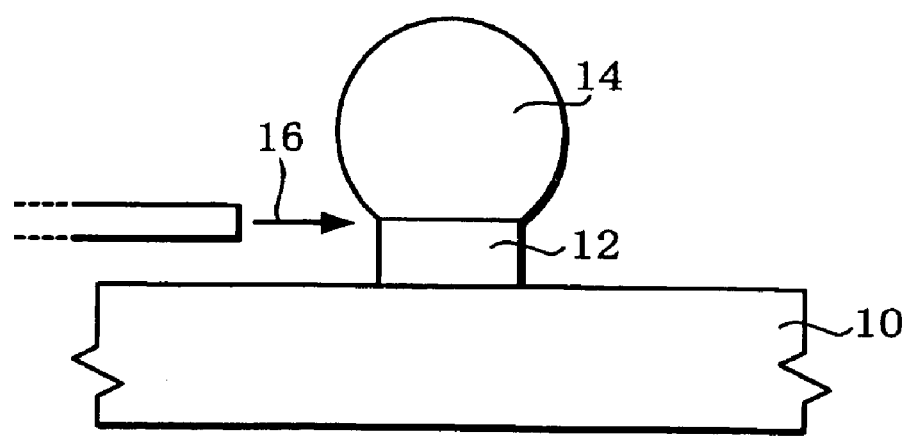
FIG. 16 is a cross-sectional view showing a schematic for one example of a method of detaching a precursor of an optical waveguide part.
Figure 17A:
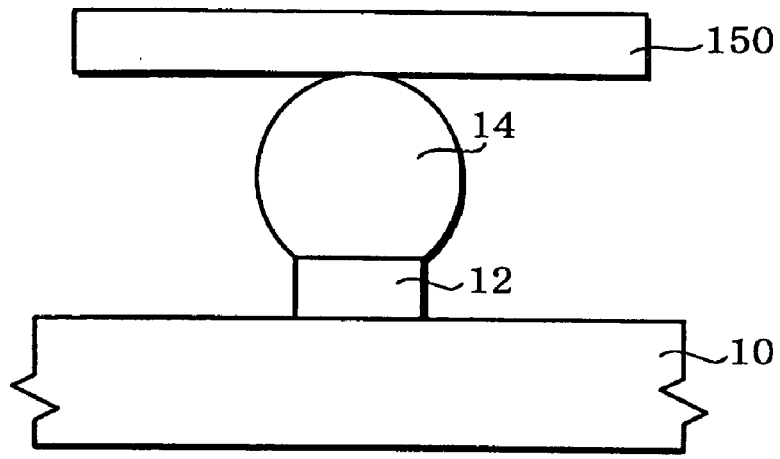
FIGS. 17(A) and (B) are cross-sectional views showing a schematic for another example of a method of detaching the precursor of the optical waveguide part.
Figure 17B:
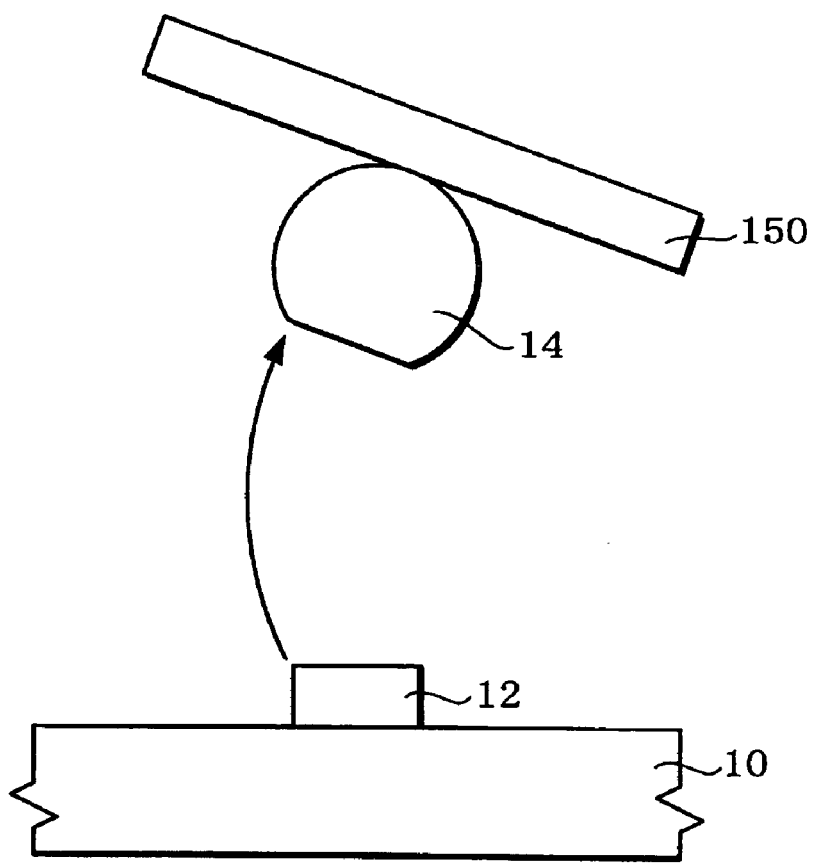

The optical waveguide part 14 can be detached from the obtained optical waveguide 100. The detached optical waveguide part 14 can be mounted on another apparatus. FIGS. 16 and 17 respectively show schematics of example methods for detaching the optical waveguide part 14 from the convex part 12.

As one example, as shown in FIG. 16, it is possible to detach the optical waveguide part 14 by blowing gas (for example, an inert gas such as argon gas or nitrogen gas) onto the joining part between the convex part 12 and the optical waveguide part 14 of the optical waveguide 100.

Alternatively, as shown in FIG. 17, it is possible to detach the optical waveguide part 14 from the upper surface 12a of the convex part 12 by sticking adhesive tape 150 onto the optical waveguide part 14 and then peeling off the tape. In this case, the optical waveguide part 14 can be made easy to detach by performing a lyophobic process on the upper surface 12a of the convex part 12 in advance.

(3) Work and Effects

According to the optical waveguide 100 of the present exemplary embodiment and its method of manufacturing, the same work and effects can be obtained as the optical waveguide 114 of the first exemplary embodiment and its method of manufacturing. In addition, the optical waveguide 100 of the present exemplary embodiment and its method of manufacturing have the work and effects described below.

(1) First, the size and form of the optical waveguide part 14 can be precisely controlled. That is, the form of the optical waveguide part 14 can be controlled according to the discharged amount of the droplet 14b. By doing so, an optical waveguide 100 including an optical waveguide part 14 of the desired form and size can be obtained.

Figure 33:
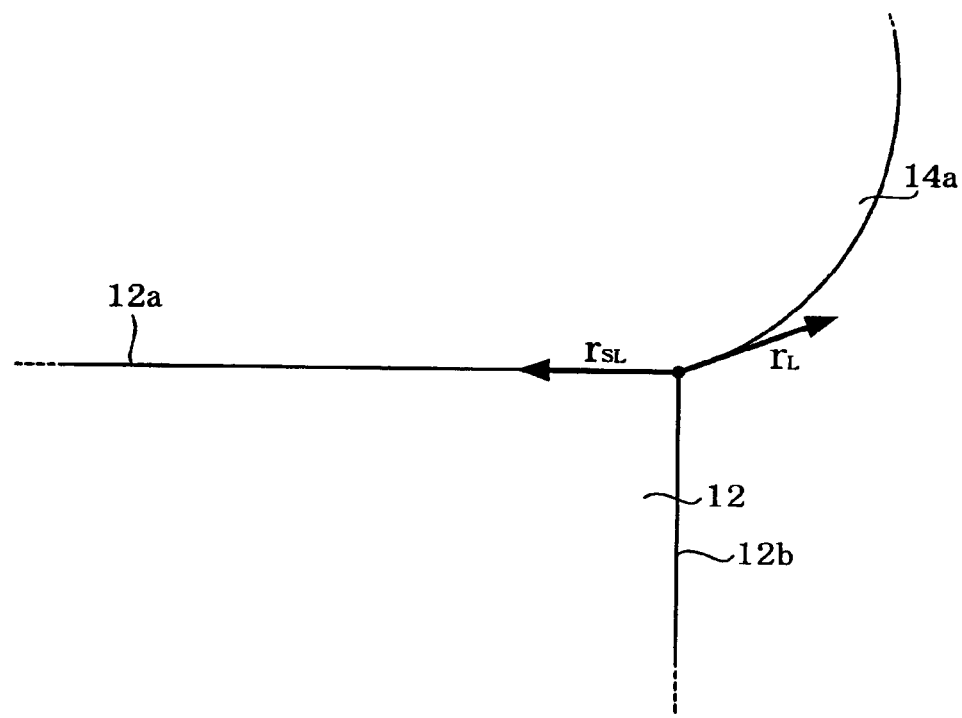
FIG. 33 is an enlargement of the cross-section in FIG. 15(b).

The work and effects described above are described now with reference to the drawings. FIG. 33 is a cross-sectional view showing a schematic of the vicinity of the joining part of the convex part 12 and the precursor 14a of the optical waveguide in the method of manufacturing the optical waveguide 100 according to the present exemplary embodiment described above, and more specifically is an enlargement of the cross-section in FIG. 15(A).

FIG. 33 shows the state in which the liquid material for forming the optical waveguide part 14 is discharged onto the substrate 10. That is, FIG. 33 shows the state before the precursor 14a of the optical waveguide part is hardened, or putting this another way, the state in which the precursor 14a of the optical waveguide part made of the aforementioned liquid material is provided on the substrate 10.

In FIG. 33, $\gamma_L$ is the surface tension of the liquid material (the precursor 14a of the optical waveguide part), while $\gamma_{SL}$ is the interfacial tension between the substrate 10 and the aforementioned liquid material. According to the method of manufacturing of the optical waveguide of the present exemplary embodiment, as shown in FIG. 33, the precursor 14a of the optical waveguide part is formed on the upper surface 12a of the convex part 12. By doing so, so long as a side surface 12b of the convex part 12 is not wetted by the precursor 14a of the optical waveguide part, the surface tension of the convex part 12 does not act on the precursor 14a of the optical waveguide part and the surface tension $\gamma_L$ of the precursor 14a of the optical waveguide part mainly acts. This means that the amount of droplets that are discharged in order to form the precursor 14a of the optical waveguide part, is adjusted, enabling the form of the precursor 14a of the optical waveguide part to be controlled. By doing so, it is possible to obtain an optical waveguide part 14 of the desired form and size. Also, as shown in FIG. 6, an optical waveguide part 14 that is approximately circular in cross-section can be obtained according to the method of manufacturing the optical waveguide 100 according to the present exemplary embodiment. Thus, an optical waveguide that has superior propagation efficiency for light can be obtained (2) Secondly, it is possible to precisely control the setting position of the optical waveguide part 14. As described above, the optical waveguide part 14 is formed by discharging the droplet 14b onto the upper surface 12a of the convex part 12 to form the precursor 14a of the optical waveguide part and then hardening the precursor 14a of the optical waveguide part (see FIG. 15(b)). It is usually difficult to precisely control the impact positions of the discharged droplets. However, with the present method, the optical waveguide part 14 can be formed on the upper surface 12a of the convex part 12 without performing any particular alignment. Namely, the droplet 14b is discharged onto the upper surface 12a of the convex part 12, enabling the precursor 14a of the optical waveguide part to be formed without performing an alignment. Putting this another way, the precursor 14a of the optical waveguide can be formed with the alignment precision achieved when forming the convex part 12. By doing so, an optical waveguide part 14 whose setting position has been controlled can be obtained easily.

(3) Thirdly, the form of the upper surface 12a of the convex part 12 is set, enabling the form of the optical waveguide part 14 to be set. Namely, the form of the upper surface 12a of the convex part 12 is appropriately selected, enabling an optical waveguide part 14 to be formed with a predetermined function. As one example, as shown in the modifications (FIGS. 9 to 12), by appropriately selecting the form of the upper surface of the convex part, it is possible to form a waveguide with a branch and/or a curved part using a simple method. Accordingly, by forming a plurality of convex parts with upper surfaces of different shapes, it is possible to set a plurality of optical waveguide parts with different forms on the same substrate.

(4) Fourthly, as described above, the optical waveguide part 14 is formed by discharging the droplet 14b to form the precursor 14a and then hardening the precursor 14a. This means that as shown in FIG. 3, an end surface 14c of the optical waveguide part 14 is a curved surface. That is, since the end surface 14c of the optical waveguide part 14 is a curved surface, these surface functions as a lens for condensing light that is emitted from the optical waveguide part 14. By doing so, when the light emitted from the optical waveguide part 14 is coupled with an optical element or the like for example, the efficiency for coupling the light can be increased. As a result, a complex optical system that uses an optical member or the like to condense the light is not required.

Third Exemplary Embodiment

1. Construction of the Optical Waveguide

FIGS. 18, 20, 22, and 24 are cross-sectional views that respectively show examples of optical waveguides according to a third exemplary embodiment. FIGS. 19, 21, 23, and 25 are plan views that show schematics of the optical waveguides shown in FIGS. 18, 20, 22, and 24, respectively. FIGS. 18, 20, 22, and 24 are cross-sectional views taken along the plane A—A in FIGS. 19, 21, 23, and 25, respectively.

In the optical waveguides shown in FIGS. 18 to 25, the same reference numerals have been appended to parts with the same constructions as in the optical waveguide 100 of the second exemplary embodiment and detailed description of such parts is omitted.

In the optical waveguide of the present exemplary embodiment, as shown in FIGS. 18 to 25, the form of the convex part differs to that of the convex part 12 that composes the optical waveguide 100 (see FIGS. 6 to 8) of the second exemplary embodiment. Also, the present exemplary embodiment shows a case where a base member is mounted on the substrate 10 and this base member is the convex part.

Also, as mentioned above, although there are no particular limitations on the three-dimensional form of the convex part, at the very least it is necessary for the convex part to be constructed so that an optical waveguide part can be set on its upper surface. The following describes the respective optical waveguides (the optical waveguides 104 to 107) shown in FIGS. 18 to 25.

Figure 18:
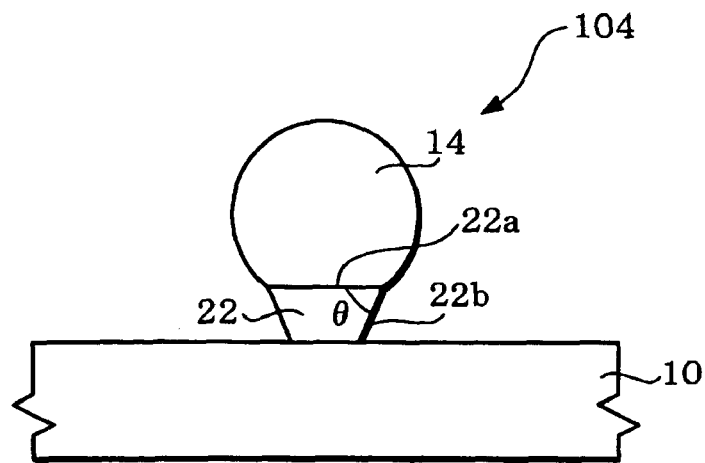
FIG. 18 is a cross-sectional view showing a schematic of an optical waveguide according to a third exemplary embodiment.
Figure 19:
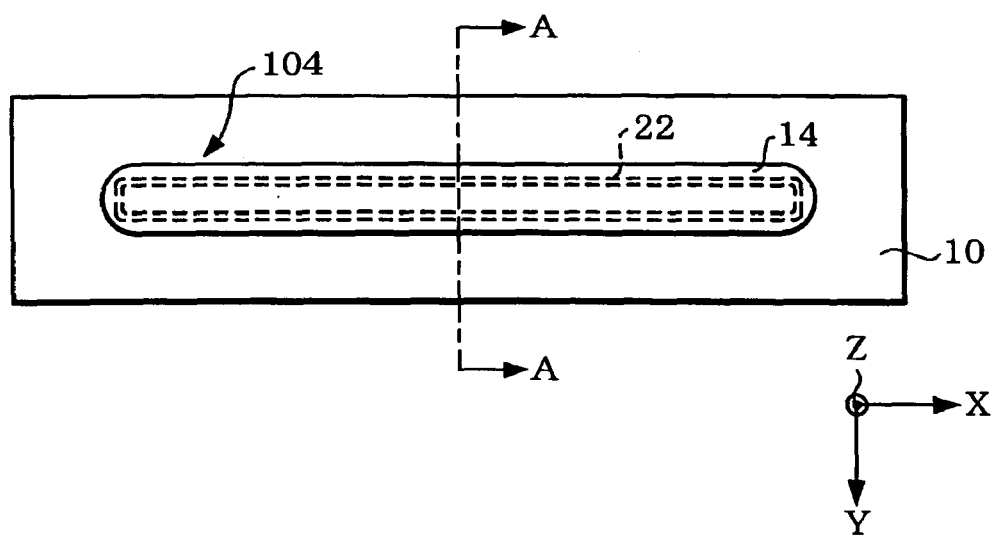
FIG. 19 is a plan view showing a schematic of the optical waveguide shown in FIG. 18.

(A) In the optical waveguide 104 shown in FIGS. 18 and 19, the angle θ made between an upper surface 22a and a side surface 22b of a convex part 22 is acute. Here, the side surface 22b of the convex part 22 refers to a surface that contacts the upper surface 22a on a side part of the convex part 22. For the convex part 22, the side part of the convex part 22 is the side surface 22b.

The optical waveguide part 14 is formed using the same processes as the optical waveguide part 14 of the second exemplary embodiment. That is, droplets are discharged onto the upper surface 22a of the convex part 22 to form a precursor (not shown in the drawings) of the optical waveguide part 14 and this precursor is then hardened to form the optical waveguide part 14. Here, since the angle made between the upper surface 22a and the side surface 22b of the convex part 22 is acute, when the droplets are discharged onto the upper surface 22a of the convex part 22, the side surface 22b of the convex part 22 can be prevented from becoming wet due to the droplets. As a result, an optical waveguide part 14 of the desired form and size can be reliably formed.

Figure 20:
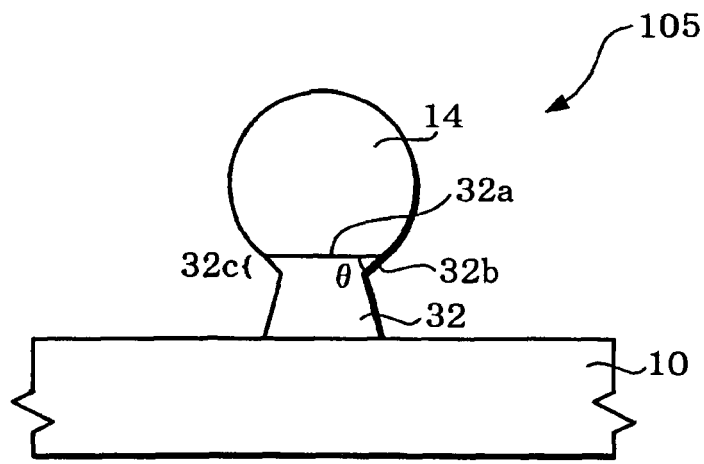
FIG. 20 is a cross-sectional view showing a schematic of an optical waveguide according to the third exemplary embodiment.
Figure 21:
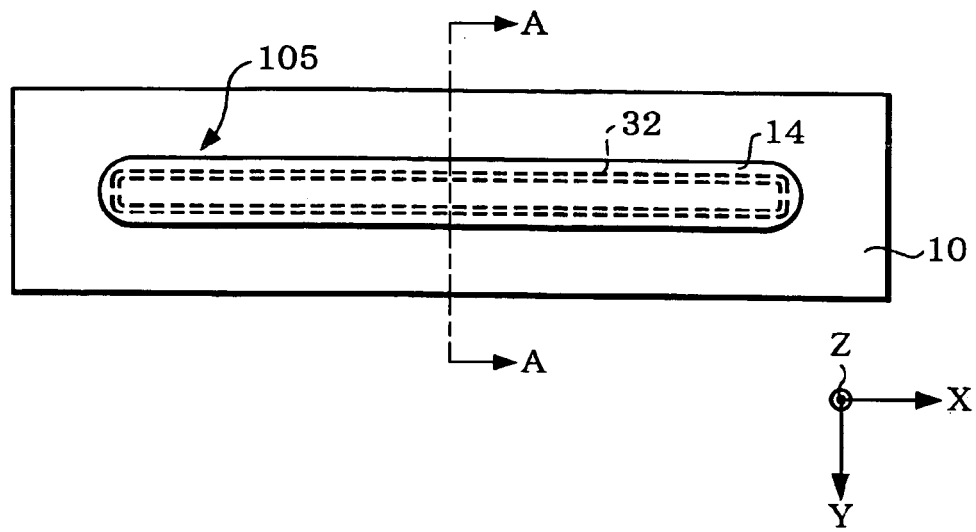
FIG. 21 is a plan view showing a schematic of the optical waveguide shown in FIG. 20.

(B) In the optical waveguide 105 shown in FIGS. 20 and 21, an upper part 32c of a convex part 32 is inversely tapered. Putting this another way, the convex part 32 is shaped like "eaves". In this case also, an angle θ made between an upper surface 32a and a side surface 32b (a surface that contacts the upper surface 32a in the side part of the convex part 32) of the convex part 32 is acute. With this construction, the stability of the convex part 32 can be maintained and the angle θ made between the upper surface 32a and the side surface 32b of the convex part 32 can be reduced. By doing so, it is possible to reliably prevent the side surface 32b of the convex part 32 from becoming wet. As a result, an optical waveguide part 14 of the desired form and size can be formed more reliably.

In the same way as the convex part 12 of the optical waveguide 100 of the second exemplary embodiment, the convex part 32 is made of polyimide resin.

Figure 22:
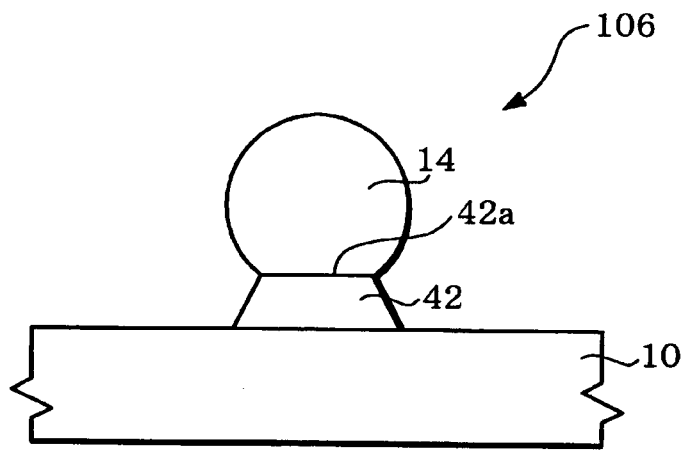
FIG. 22 is a cross-sectional view showing a schematic of an optical waveguide according to the third exemplary embodiment.
Figure 23:
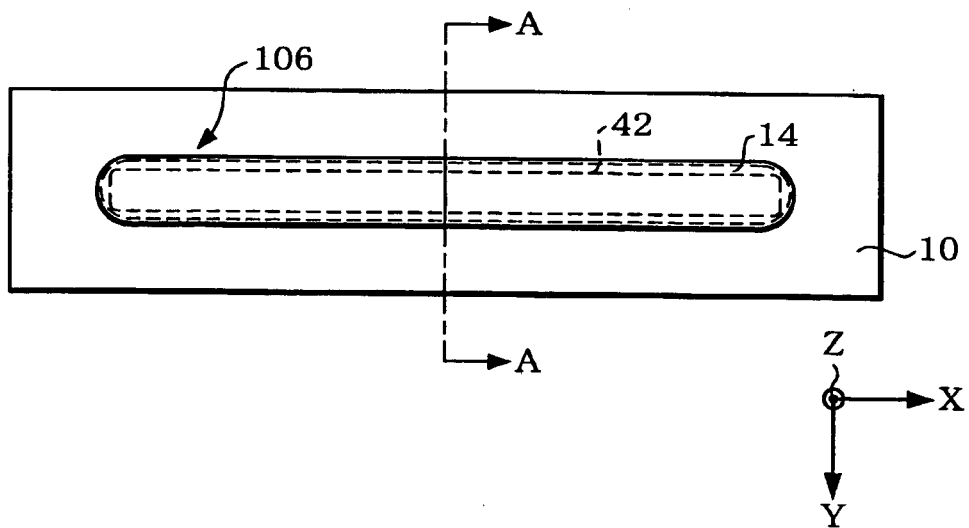
FIG. 23 is a plan view showing a schematic of the optical waveguide shown in FIG. 22.

(C) In the optical waveguide 106 shown in FIGS. 22 and 23, the cross-sectional form of the convex part 32 is trapezoidal.

Figure 24:
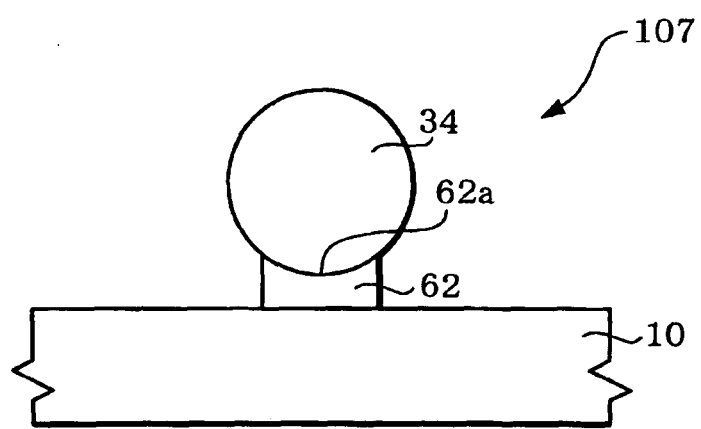
FIG. 24 is a cross-sectional view showing a schematic of an optical waveguide according to the third exemplary embodiment.
Figure 25:
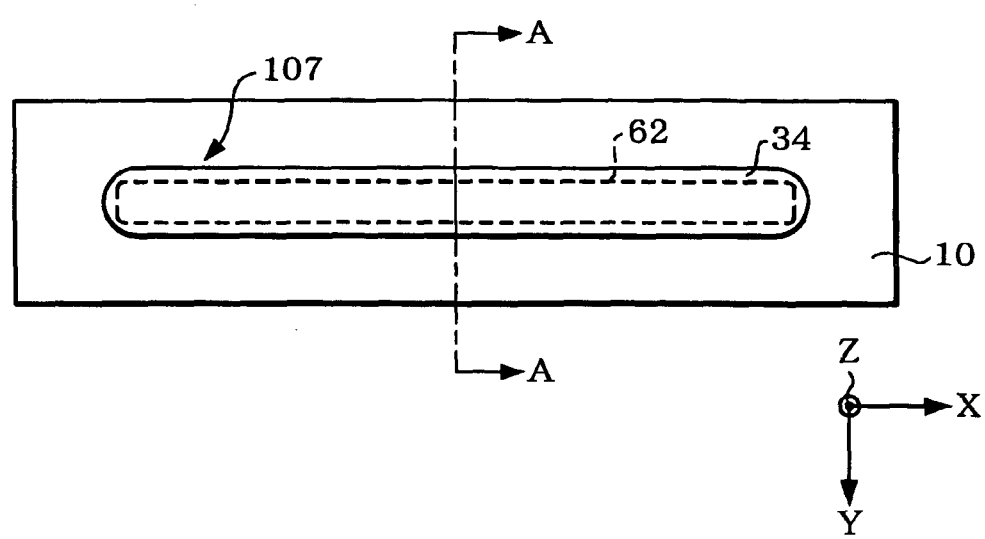
FIG. 25 is a plan view showing a schematic of the optical waveguide shown in FIG. 24.

(D) In the optical waveguide 107 shown in FIGS. 24 and 25, an upper surface 62 of a convex part 62 is a curved surface. Each of the optical waveguides above were described for the case where the upper surface of the convex part is flat, but in the optical waveguide 107 shown in FIGS. 24 and 25, the upper surface 62a of the convex part 62 is a curved surface. The optical waveguide part 34 can be made using the same method and from the same material as the optical waveguide part 14.

With the optical waveguide 107, an almost spherical optical waveguide part 34 can be mounted on the upper surface 62a of the convex part 62. In the optical waveguide of the exemplary embodiments described above (see FIGS. 6 to 13 and FIGS. 18 to 23), the upper surface of the convex part can be made into a curved surface. Also, in the optical waveguide 107, by adjusting the form and size of the upper surface 62a of the convex part 62 and the amount of droplets used to form the optical waveguide part 34, it is possible to form an optical waveguide part in the form of an oval sphere. In this case, the cross-sectional form of the optical waveguide is oval.

Method of Manufacturing the Optical Waveguide

Next, the method of manufacturing the optical waveguide 105 (see FIGS. 20 and 21), out of the optical waveguides 104 to 107 (see FIGS. 18 to 25) of the present exemplary embodiment is described with reference to FIGS. 26(A) to 26(E). FIGS. 26(A) to 26(E) are cross-sectional views respectively showing schematics of manufacturing processes of the optical waveguide 105 shown in FIGS. 20 and 21.

(1) Forming the Convex Part 32

Except for the patterning process for the convex part 32, the method of manufacturing the optical waveguide 105 of the present exemplary embodiment is the same as the method of manufacturing the optical waveguide 100 of the second exemplary embodiment. For this reason, the patterning process for the convex part 32 is mainly described here.

Figure 26A:
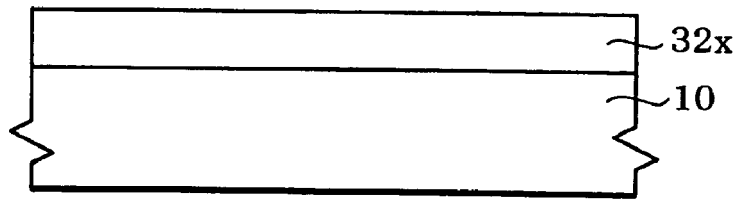
FIGS. 26(A) to 26(E) are cross-sectional views respectively showing schematics of processes in the method of manufacturing the optical waveguide shown in FIGS. 20 to 21.
Figure 26B:
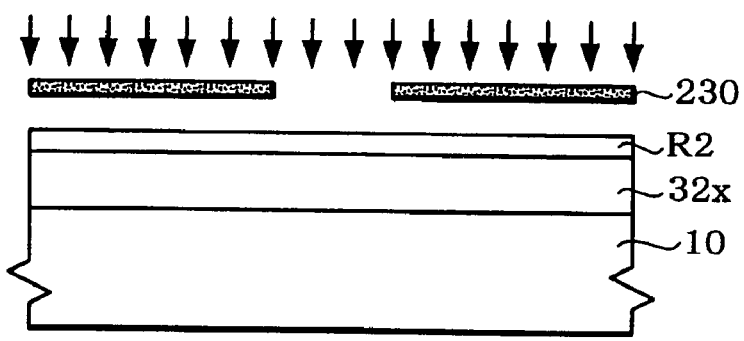
Figure 26C:
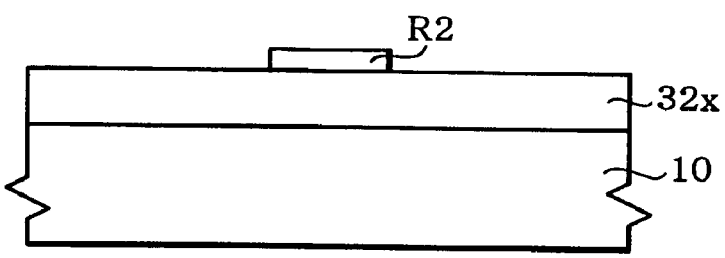
Figure 26D:
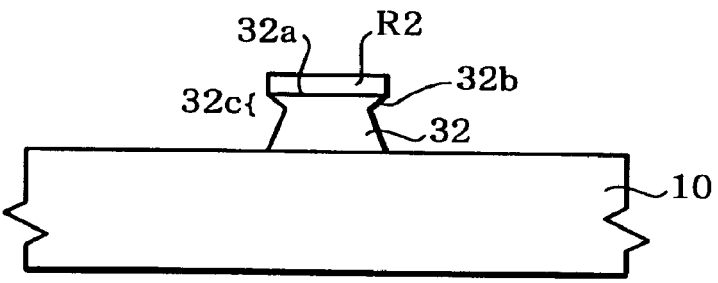
Figure 26E:
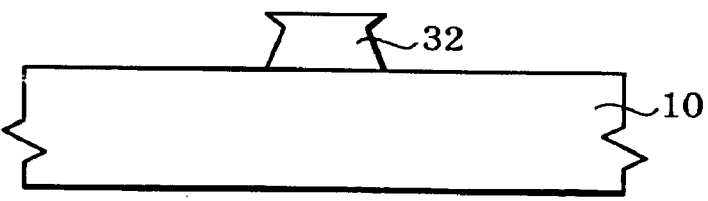

After forming a resin layer 32x on the substrate 10, a resist layer R1 with a predetermined pattern is formed (see FIGS. 26(A) to 26(C)). The process thus far is the same as in the method of manufacturing the optical waveguide 100 of the second exemplary embodiment (see FIGS. 14(A) to 14(C)).

Next, a heat treatment is performed at a temperature (such as 130° C.) which does not affect the resist. In this heat treatment, it is preferable for heat to be applied from the upper surface side of the resin layer 32x, so that a part of the resin layer 32x on upper surface side (the resist layer R1 side) becomes more hardened than a part of the resin layer 32x on the substrate 10 side.

Next, wet etching is performed on the resin layer 32x with the resist layer R1 as a mask. In this process, the penetration speed of the etchant is slower for the part directly below the resist layer R1, which is to say, the upper part of the resin layer 32x, than for the other parts, so that it is difficult for the upper part to be etched. Also, the extent of the hardening due to the heat treatment is larger for the upper surface side part of the resin layer 32x than for the substrate 10 side part. This means that the etching rate of the wet etching is lower for the part of the resin layer 32x on the upper surface side than for the part on the substrate 10 side. This means that during the wet etching, the etching speed is slower for the upper surface side part of the resin layer 32x than for the part on the substrate 10 side, so that more of the upper surface side part of the resin layer 32x remains compared to the part on the substrate 10 side. As a result, a convex part 32 (see FIG. 26(d)) formed with an inversely tapered upper part 32c can be obtained. After this, the resist layer R2 is removed (see FIG. 26(e)).

(B) Forming the Optical Waveguide Part 14

Next the optical waveguide part 14 is formed. The method of forming the optical waveguide part 14 is the same as the method of forming the optical waveguide part 14 of the second exemplary embodiment, so description of it is omitted.

In this way, the optical waveguide 105 is obtained (see FIGS. 20 and 21).

3. Work and Effects

The optical waveguide 105 of the present exemplary embodiment and its method of manufacturing have the same work and effects as the optical waveguides of the first and second exemplary embodiments and their methods of manufacturing. In addition, the optical waveguide 105 and its method of manufacturing have the work and effects that are described in the "Construction of the Optical Waveguide" and "Method of Manufacturing the Optical Waveguide" sections.

Fourth Exemplary Embodiment

1. Construction of the Optical Waveguide

Figure 27:
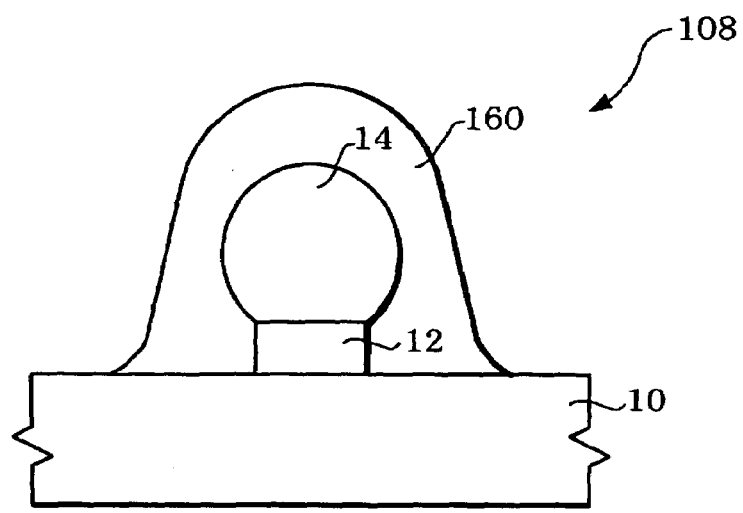
FIG. 27 is a cross-sectional view showing a schematic of an optical waveguide according to a fourth exemplary embodiment.
Figure 28:
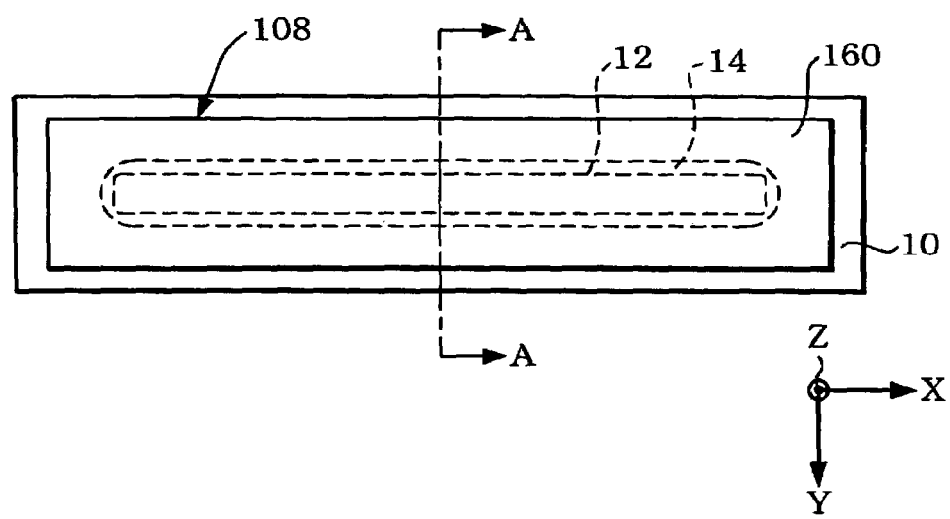
FIG. 28 is a plan view showing a schematic of the optical waveguide shown in FIG. 27.

FIG. 27 is a cross-sectional view showing a schematic of an optical waveguide 108 according to a fourth exemplary embodiment. FIG. 28 is a plan view showing a schematic of the optical waveguide 108 shown in FIG. 27. FIG. 27 shows a cross-section taken along the plane A—A in FIG. 28.

As shown in FIGS. 27 and 28, the optical waveguide 108 of the present exemplary embodiment includes the convex part (base member) 12 that is provided on the substrate 10, the optical waveguide part 14 that is provided on the upper surface 12a of the convex part 12, and a covering layer 160 that covers the optical waveguide part 14. More specifically, as shown in FIGS. 27 and 28, the optical waveguide 108 of the present exemplary embodiment is produced by forming the optical waveguide 100 of the second exemplary embodiment so as to be buried under the covering layer 160.

The covering layer 160 has a lower refractive index than the optical waveguide part 14. Also, the convex part 12 has a lower refractive index than the optical waveguide part 14. That is, the optical waveguide part 14 is covered by layers (the covering layer 160 and the convex part 12) with lower refractive indexes than the optical waveguide part 14. Putting this another way, in the optical waveguide 108, the optical waveguide 104 functions as the core, and the convex part 12 and the covering layer 160 function as cladding. There are no particular limitations on the material of the covering layer 160, and as one example, resin can be used.

Also in this case, the convex part 12 and the covering layer 160 can be formed from materials with approximately the same refractive index. In this way, in the same way as with the construction of an optical fiber, the entire circumference of the optical waveguide part 14 can be covered with materials with approximately the same refractive index.

2. Method of Manufacturing the Optical Waveguide

The optical waveguide of the present exemplary embodiment can be formed by burying the optical waveguide part 14 of the optical waveguide 100 (see FIGS. 6 to 8) of the second exemplary embodiment under the covering layer 160. The form of the covering layer 160 can be selected as appropriate according to the material and thickness of the covering layer 160. As one example, when the covering layer 160 is made of resin, a dispenser method, an ink jet method, a spin coating method, a vapor deposition method, and an LB (Langmuir-Blodgett) method are examples of methods that can be used.

3. Work and Effects

The optical waveguide 108 of the present exemplary embodiment and its method of manufacturing have the same work and effects as the optical waveguide of the second exemplary embodiment and its method of manufacturing. In addition the optical waveguide 108 of the present exemplary embodiment and its method of manufacturing have the work and effects described below.

According to the optical waveguide 108 of the present exemplary embodiment, the optical waveguide part 14 is covered by layers (the covering layer 160 and the convex part 12) that have a lower refractive index than the optical waveguide part 14, so that the leakage of light from the optical waveguide part 14 can be reduced. By doing so, the propagation efficiency for the light propagated inside the optical waveguide part 14 can be improved further.

Also, by burying the optical waveguide part 14 under the covering layer 160, the optical waveguide part 14 can be securely fixed onto the upper surface 12a of the convex part 12.

Although the optical waveguide 108 of the present exemplary embodiment shows the case where the covering layer 160 is formed on the optical waveguide 100 of the second exemplary embodiment, covering layers can be formed on the optical waveguides of the first and third exemplary embodiments in the same way, as necessary.

Fifth Exemplary Embodiment

1. Construction of the Optical Waveguide

Figure 29:
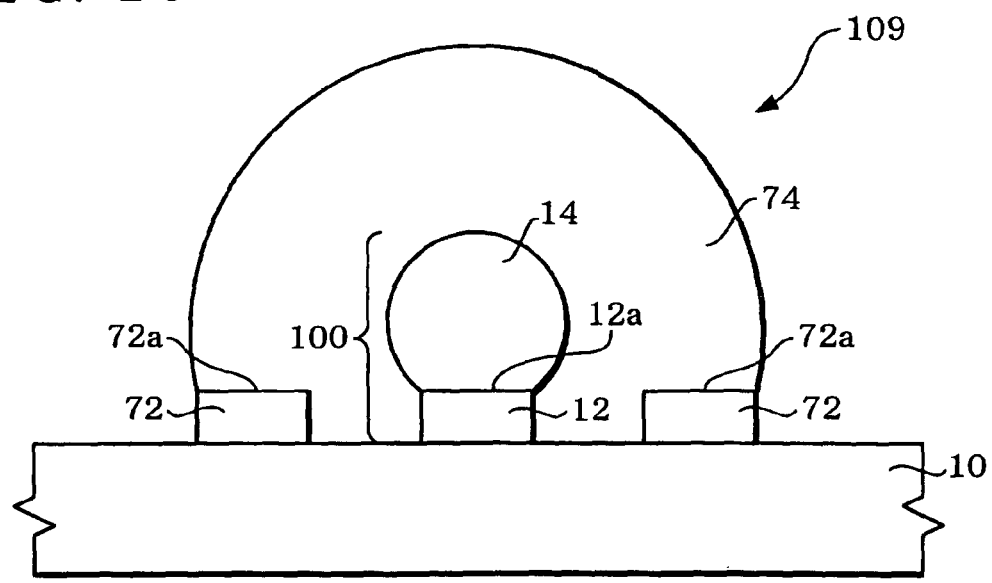
FIG. 29 is a cross-sectional view showing a schematic of an optical waveguide according to a fifth exemplary embodiment.
Figure 30:
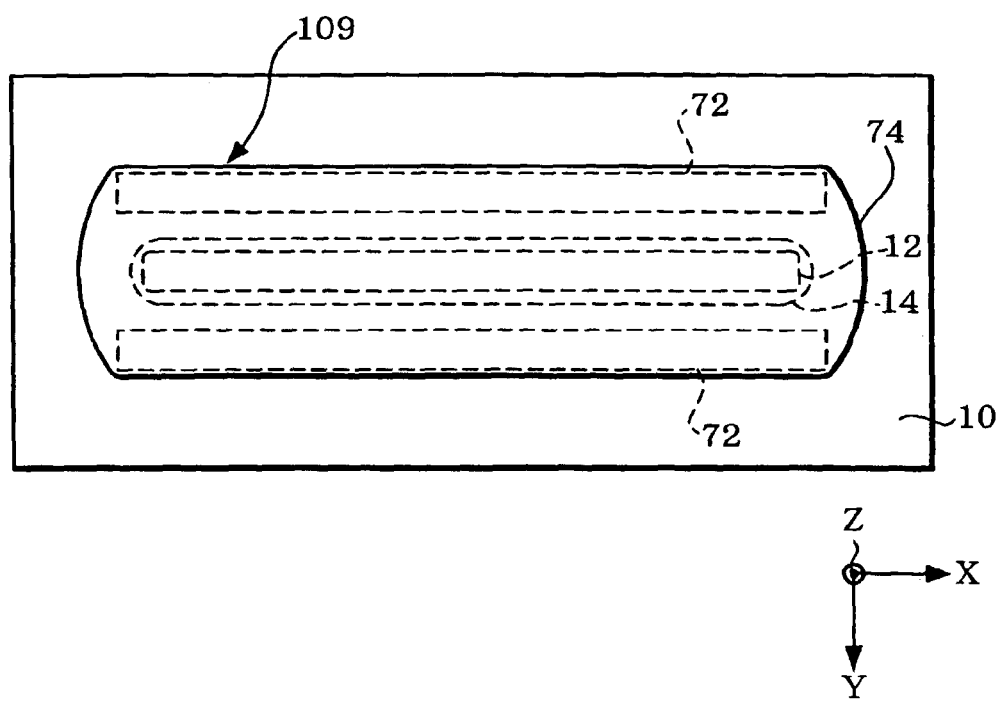
FIG. 30 is a plan view showing a schematic of the optical waveguide shown in FIG. 29.

FIG. 29 is a cross-sectional view showing a schematic of an optical waveguide 109 of a fifth exemplary embodiment. FIG. 30 is a plan view showing a schematic of the optical waveguide 109 shown in FIG. 29. FIG. 29 shows a cross-section taken along the plane A—A of the FIG. 30.

As shown in FIGS. 29 and 30, the optical waveguide 109 of the present exemplary embodiment includes the convex part (first convex part) 12 provided on the substrate 10, the optical waveguide part 14, second convex parts 72, and a covering layer 74.

More specifically, as shown in FIGS. 29 and 30, the optical waveguide 109 includes the optical waveguide 100 of the second exemplary embodiment. The two second convex parts 72 are set to sandwich the optical waveguide 100. Also, the optical waveguide 100 is buried under the covering layer 74. Part of the covering layer 74 is formed on upper surfaces 72a of the two second convex parts 72.

The second convex parts 72 are disposed in parallel with the convex part 12. More specifically, as shown in FIG. 30, the two second convex parts 72 are formed so as extend in parallel with the convex part 12 and the X direction with the convex part 12 being sandwiched between them.

The covering layer 74 has a lower refractive index than the optical waveguide part 14. The convex part 12 also has a lower refractive index than the optical waveguide part 14. That is, the optical waveguide part 14 is covered with layers (the covering layer 74 and the convex part 12) that have lower refractive indexes than the optical waveguide part 14. Putting this another way, in this optical waveguide 109, the optical waveguide part 14 functions as the core and the convex part 12 and the covering layer 74 function as cladding.

There are no particular limitations on the material of the covering layer 74, and as one example, resin can be used. The optical waveguide 109 of the present exemplary embodiment describes the case where, in the same way as the optical waveguide part 14, the covering layer 74 is formed by hardening a liquid material that can be hardened by applying energy.

2. Method of Manufacturing the Optical Waveguide

Figure 31A:
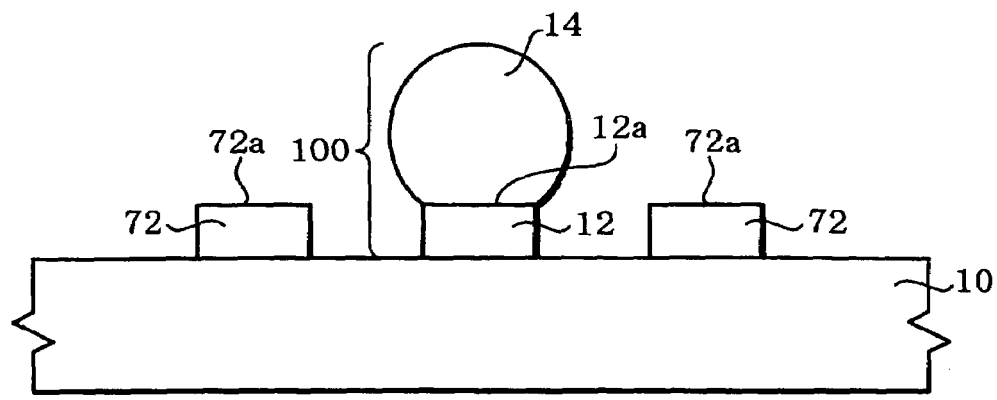
FIGS. 31(A) and 31(B) are cross-sectional views respectively showing schematics of processes in the method of manufacturing the optical waveguide shown in FIGS. 29 and 30.
Figure 31B:
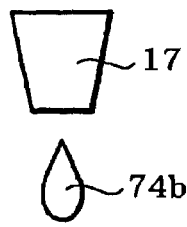
Figure 31B:
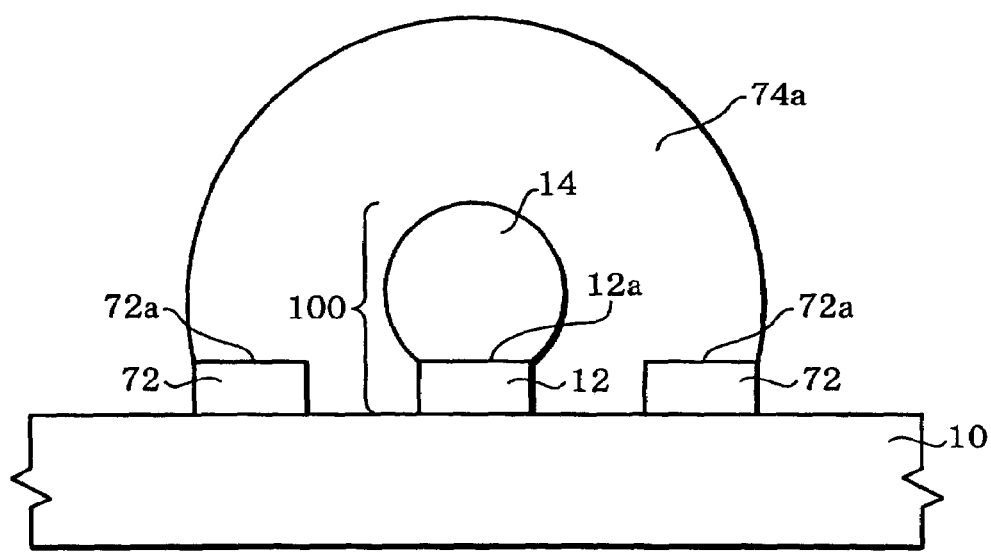

Next, the method of manufacturing the optical waveguide of the present exemplary embodiment is described using FIGS. 31(a) and 31(b). FIGS. 31 (a) and 31 (b) are cross-sectional views showing schematics of manufacturing processes of the optical waveguide 109 shown in FIGS. 29 and 30.

(1) Forming the First Convex Part 12, the Optical Waveguide Part 14, and the Second Convex Parts 72

In the present exemplary embodiment, first the optical waveguide 100 of the second exemplary embodiment is formed. The method of manufacturing the optical waveguide 100 is the same as that described in the section of the second exemplary embodiment (see FIGS. 14(A) to 14(E) and FIGS. 15(A) to 15(C)), so description of such is omitted here.

Next, the two second convex parts 72 are formed on the substrate 10. The first convex part 12 is formed between the two second convex parts 72 and the two second convex parts 72 are formed so as to extend in parallel with the first convex part 12.

Alternatively, instead of forming the second convex parts 72 after forming the optical waveguide 100, the second convex parts 72 may be formed in the same process that forms the convex part (the first convex part) 12 of the optical waveguide 100.

In this way, the optical waveguide 100 and the second convex parts 72 are formed (see FIG. 31(a)). As shown in FIG. 31(a), the optical waveguide 100 includes the first convex part 12 and the optical waveguide part 14.

(2) Forming the Covering Layer 74

Next, the covering layer 74 is formed. In the present exemplary embodiment, in the same way as the optical waveguide part 14, the covering layer 74 is formed using a liquid material that can be hardened by applying energy.

First, a droplet (a second droplet) 74b is discharged onto the optical waveguide part 14 and the upper surfaces 72a of the two second convex parts 72. Here, the region that is sandwiched between the two second convex parts 72 is referred to as "inside the second convex parts 72" while the sides that are opposite the sides of the second convex parts 72 on which the first convex part 12 is formed are referred to as "outside the second convex parts 72". In this process, the discharged amount of the droplet 74b is adjusted so that after impact the droplet 74b is not positioned outside the second convex parts 72. Also, a method similar to that used when forming the optical waveguide part 14 in the second exemplary embodiment can be used as the discharge method for the droplet 74b. For these reasons, detailed description of it is omitted. As a result of the above processes, a precursor for a covering layer 74a is formed (see FIG. 31(B)).

The precursor for a covering layer 74a is formed on the upper surfaces 72a of the second convex parts 72 and covers the optical waveguide part 14. More specifically, as shown in FIG. 31 (B), the first convex part 12 and the optical waveguide part 14 are buried under the precursor for a covering layer 74a, and part of the precursor for a covering layer 74a is formed on the upper surfaces 72a of the two second convex parts 72.

Next, energy is applied to the precursor for a covering layer 74a to harden it. A method similar to that used when forming the optical waveguide part 14 of the second exemplary embodiment can be used as the method of hardening the precursor for a covering layer 74a. For this reason, detailed description of it is omitted. As a result of the above processes, the optical waveguide 109 that includes the optical waveguide part 14 and the covering layer 74 is obtained.

In the present exemplary embodiment, an optical waveguide 109 that includes the optical waveguide 100 of the second exemplary embodiment is described, although the optical waveguide of the present exemplary embodiment can be formed in the same way using the optical waveguides of the first and third exemplary embodiments in place of the optical waveguide 100.

3. Work and Effects

The optical waveguide 109 of the present exemplary embodiment and its method of manufacturing have the same work and effects as the optical waveguide of the fourth exemplary embodiment and its method of manufacturing. In addition, the optical waveguide 109 of the present exemplary embodiment and its method of manufacturing have the work and effects described below.

(1) Firstly, the droplet (a second droplet) 74b is discharged onto the optical waveguide part 14 and the upper surfaces 72a of the second convex parts 72 to form the precursor for a covering layer 74a. In this process, the precursor for a covering layer 74a is formed on the upper surfaces 72a of the second convex part 72, so that an optical waveguide 109 that is more circular in cross-section can be obtained. By doing so, the leakage of light from the optical waveguide part 14 can be reduced. As a result, an optical waveguide with even more superior propagation efficiency for light can be obtained.

(2) Secondly, in the process that discharges the droplet 74b in order to form the precursor for a covering layer 74a, the two second convex parts 72 are set to sandwich the convex part 12, so that the covering layer 74 is formed on the upper surfaces 72a of the second convex parts 72 and on the inside of the second convex parts 72. That is, by setting the second convex parts 72 at predetermined positions, the setting positions, the form, and the size of the covering layer 74 can be controlled. By discharging the droplet 74b after setting the second convex parts 72 at the predetermined positions, the covering layer 74 can be formed at only the required parts, which saves on materials.

When the optical waveguide 100 of the second exemplary embodiment is formed on a substrate on which elements and electric wiring are provided, for example, it is preferable to cover the optical waveguide part 14 with a covering layer to prevent the propagation efficiency of light inside the optical waveguide part 14 from deteriorating due to light leaking from the optical waveguide part 14 to the outside. However, in this case, elements and electric wiring are mounted on the substrate, so that it can be difficult to form the covering layer on the entire substrate. On the other hand, according to the optical waveguide 109 of the present exemplary embodiment, the second convex parts 72 are set to sandwich the optical waveguide 100 and the covering layer 74 is formed by discharging the droplet 74b, so that the covering layer 74 can be formed only in the required parts. By doing so, a substrate on which elements, electric wiring, and optical waveguides are all mounted can be formed.

Sixth Exemplary Embodiment

1. Circuit Board, Optical Module, Optical Transfer Apparatus

Figure 32:
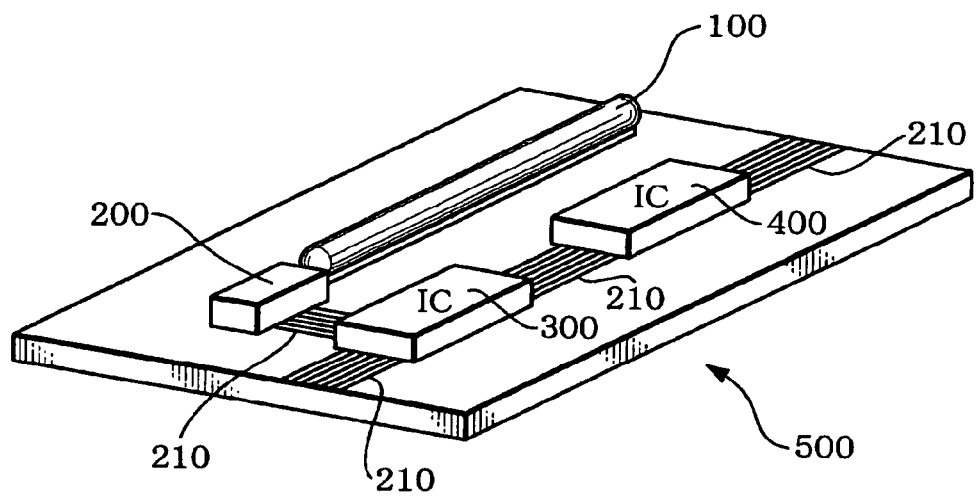
FIG. 32 is a cross-sectional view showing a schematic of a circuit board according to the sixth exemplary embodiment.

FIG. 32 is a perspective view showing a schematic of a circuit board 500 according to the present exemplary embodiment.

As shown in FIG. 32, the circuit board 500 includes the optical waveguide 100 of the second exemplary embodiment, a light-emitting element 200, and ICs 300 and 400. These components are formed on a substrate 110.

The optical waveguide 100 is connected to the light-emitting element 200 and propagates light that is emitted from the light-emitting element 200. The light-emitting element 200 and the IC 300 are electrically connected by electrical wiring 210, as are the IC 300 and the IC 400. The optical waveguide 100 and the light-emitting element 200 compose an optical module. The optical module is used as part of an optical transfer apparatus (not shown in the drawings). This optical transfer apparatus connects electronic appliances, such as a computer, a display, a storage apparatus, a printer, etc., together.

The electrical wiring 210 can be formed by a similar method to the method of manufacturing the optical waveguide of the first exemplary embodiment or the second exemplary embodiment. More specifically, as one example, the electrical wiring 210 can be formed by discharging a resin precursor in the form of droplets that include a conductive material onto the substrate 110 using an ink jet method and then hardening the resin precursor. Alternatively, the electrical wiring 210 can be formed by discharging a dispersed liquid, which is obtained by dispersing a conductive material in a solvent, using the same kind of method and then removing the solvent to dry the dispersed liquid.

In the circuit board 500 of the present exemplary embodiment, a light receiving element (not shown in the drawing) may be mounted in place of the light-emitting element 200. In this case, light that is propagated in the optical waveguide 100 is incident on the light receiving element. Also, although the circuit board 500 of the present exemplary embodiment is described for the case where the optical waveguide 100 of the second exemplary embodiment is included, it is possible to use the optical waveguide of any of the first or third to fifth exemplary embodiments in place of the optical waveguide 100 of the second exemplary embodiment.

The present invention is not limited to the exemplary embodiments described above, and can be modified in a variety of ways. As one example, the present invention includes constructions (for example, constructions that have the same functions, methods, and results, or constructions that have the same object and result) that are effectively the same as the constructions described in the exemplary embodiments. The present invention also includes constructions in which the non-essential parts of the constructions described in the exemplary embodiments is replaced. The present invention also includes constructions that have the same work and effects and constructions that can achieve the same object as the constructions described in the exemplary embodiments. The present invention also includes constructions in which well-known techniques have been applied to the constructions described in the exemplary embodiments.

What is claimed is:

1. An optical waveguide, comprising:
a convex member provided on a substrate; and
an optical waveguide member provided solely on the convex member,
the convex member having a lower refractive index than the optical waveguide member,
a maximum width of maximum cross-section of the optical waveguide member being longer than a width of a lower surface of the optical waveguide member.

2. The optical waveguide according to claim 1,
a covering layer being formed around the optical waveguide, and the refractive index of the convex member and the refractive index of the covering layer are approximately equal.

3. The optical waveguide according to claim 1,
the convex member being integrally formed with the substrate.

4. The optical waveguide according to claim 1,
a cross-section of the optical waveguide member being in the shape of a truncated circle or a truncated oval.

5. The optical waveguide according to claim 1,
a cross-section of the optical waveguide member being in the shape of a circle or an oval.

6. The optical waveguide according to claim 1,
an upper surface of the convex member being a curved surface.

7. The optical waveguide according to claims 1,
an angle made between an upper surface of the convex member and a surface that contacts the upper surface on a side part of the convex member being acute.

8. The optical waveguide according to claim 1,
an upper part of the convex member being formed in an inversely tapered shape.

9. The optical waveguide according to claim 1,
the optical waveguide being buried under a layer with a lower refractive index than the optical waveguide member.

10. A circuit board, comprising:
the optical waveguide according to claim 1;
an IC; and
an optical element.

11. An optical module, comprising:
the optical waveguide according to claim 1.

12. An optical transfer apparatus, comprising:
the optical module according to claim 11.

13. An optical waveguide, comprising:
a first convex member provided on a substrate;
an optical waveguide member provided solely on an upper surface of the first convex member;
a second convex member provided on the substrate, the second convex member being disposed in parallel with the first convex member; and
a covering layer that covers an optical waveguide member and is provided in part on an upper surface of the second convex member,
the optical waveguide including two of the second convex members and the first convex member being disposed between the two second convex members.

14. An optical waveguide, comprising:
a convex member provided on a substrate; and
an entire optical waveguide member provided solely on the convex member,
the convex member being disposed in parallel with the optical waveguide member,
a maximum width of maximum cross-section of the optical waveguide member being longer than a width of a lower surface of the optical waveguide member.

* * * * *